United States Patent
Albero et al.

(10) Patent No.: US 11,245,704 B2
(45) Date of Patent: Feb. 8, 2022

(54) AUTOMATICALLY EXECUTING RESPONSIVE ACTIONS BASED ON A VERIFICATION OF AN ACCOUNT LINEAGE CHAIN

(71) Applicant: Bank of America Corporation, Charlotte, NC (US)

(72) Inventors: George Albero, Charlotte, NC (US); Edward Lee Traywick, Charlotte, NC (US); Scot L. Daniels, Clover, SC (US)

(73) Assignee: Bank of America Corporation, Charlotte, NC (US)

( * ) Notice: Subject to any disclaimer, the term of this patent is extended or adjusted under 35 U.S.C. 154(b) by 242 days.

(21) Appl. No.: 16/737,502

(22) Filed: Jan. 8, 2020

(65) Prior Publication Data
US 2021/0211431 A1 Jul. 8, 2021

(51) Int. Cl.
*H04L 29/06* (2006.01)
*G06F 21/62* (2013.01)
*G06N 20/00* (2019.01)

(52) U.S. Cl.
CPC ........ *H04L 63/102* (2013.01); *G06F 21/6218* (2013.01); *H04L 63/108* (2013.01); *G06N 20/00* (2019.01)

(58) Field of Classification Search
CPC ................ H04L 63/102; H04L 63/108; H04L 2463/121; G06F 21/6218; G06F 21/554; G06F 21/552; G06N 20/00
See application file for complete search history.

(56) References Cited

U.S. PATENT DOCUMENTS

| | | | |
|---|---|---|---|
| 5,193,185 | A | 3/1993 | Lanter |
| 6,070,244 | A | 5/2000 | Orchier et al. |
| 7,437,362 | B1 | 10/2008 | Ben-Natan |
| 8,037,106 | B2 | 10/2011 | Barrenechea |
| 8,650,225 | B2 | 2/2014 | Barrenechea |
| 8,892,504 | B2 | 11/2014 | Wan |
| 2003/0110394 | A1 | 6/2003 | Sharp et al. |
| 2004/0034594 | A1 | 2/2004 | Thomas et al. |
| 2005/0114367 | A1 | 5/2005 | Serebrennikov |
| 2007/0061885 | A1 | 3/2007 | Hammes et al. |

(Continued)

*Primary Examiner* — Chau Le
*Assistant Examiner* — Han Yang
(74) *Attorney, Agent, or Firm* — Banner & Witcoff, Ltd.

(57) ABSTRACT

Aspects of the disclosure relate to account lineage tracking and automatically executing responsive actions upon detecting an account lineage. A computing platform may receive a first account-change message from a source-level interceptor. The first account-change message may include information identifying a source account associated with a first computing device and identifying a first target account. The first target account may be associated with a target application configured to access the target database. The computing platform may receive a second account-change message from a database-level interceptor. The second account-change message may include information identifying the first target account as a database-level source account and identifying a second target account associated with one or more target databases. After receiving the first and second account-change messages, the computing platform may generate a notification comprising information associated with an account lineage between the source account and the second target account.

20 Claims, 24 Drawing Sheets

(56) References Cited

U.S. PATENT DOCUMENTS

| | | |
|---|---|---|
| 2008/0262969 A1 | 10/2008 | Samid |
| 2009/0144202 A1 | 6/2009 | Hurry |
| 2011/0035354 A1* | 2/2011 | Wan ................ G06F 16/25 707/602 |
| 2011/0047078 A1 | 2/2011 | Ginter et al. |
| 2012/0310875 A1 | 12/2012 | Prahlad et al. |
| 2014/0075028 A1 | 3/2014 | Welner et al. |
| 2014/0304183 A1 | 10/2014 | Zabar |
| 2016/0203213 A1* | 7/2016 | Lewis ................ H04L 63/123 707/737 |
| 2016/0330219 A1 | 11/2016 | Hasan |
| 2017/0270022 A1 | 9/2017 | Moresmau et al. |
| 2017/0346846 A1 | 11/2017 | Findlay |
| 2019/0057147 A1 | 2/2019 | Bursik et al. |
| 2021/0211517 A1* | 7/2021 | Albero ................ G06Q 40/02 |

* cited by examiner

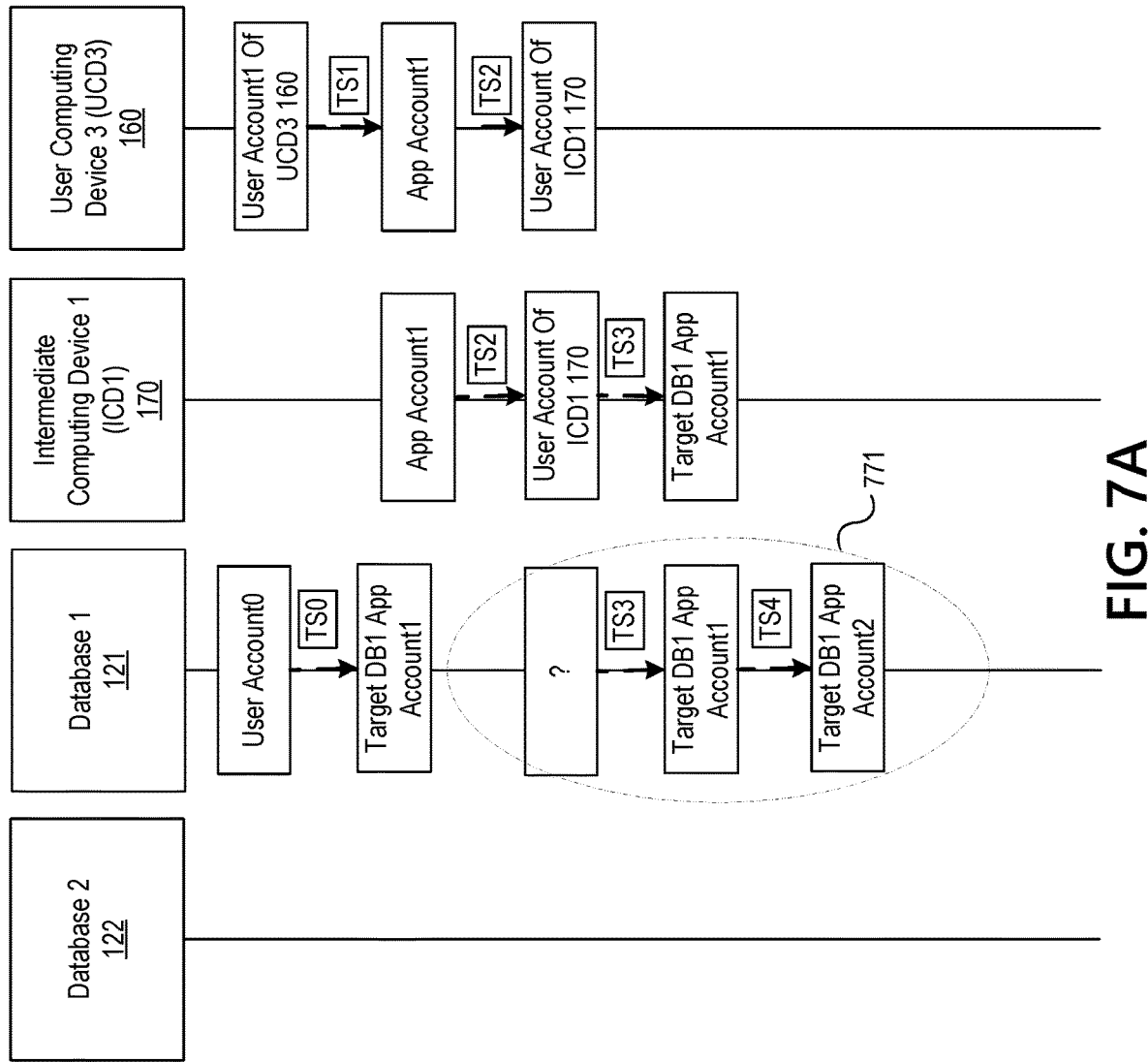

AUTOMATICALLY EXECUTING RESPONSIVE ACTIONS BASED ON A VERIFICATION OF AN ACCOUNT LINEAGE CHAIN

BACKGROUND

Aspects of the disclosure relate to deploying digital data processing systems, providing information security, and preventing unauthorized access to resources of an information system. In particular, one or more aspects of the disclosure relate to controlling access to secure information resources using account lineage tracking and verification systems and providing account lineage profiles.

Enterprise organizations may utilize various computing infrastructure to maintain large data sets, which may include confidential information and/or other sensitive data that is created and/or used for various purposes. In some instances, these large data sets may need to be accessed by and/or transferred across various networks and/or between various computer systems. Ensuring security when accessing and/or transferring such data may be critically important to protect the integrity and confidentiality of the underlying information. In many instances, however, it may be difficult to ensure the integrity and confidentiality of the information associated with the data sets while also attempting to optimize the resource utilization, bandwidth utilization, and efficient operations of the computing infrastructure involved in maintaining, accessing, and transferring the data.

SUMMARY

Aspects of the disclosure provide effective, efficient, scalable, and convenient technical solutions that address and overcome the technical problems associated with ensuring information security and preventing unauthorized access to resources of enterprise computer systems by controlling access to secure information resources using account lineage tracking and verification systems and providing account lineage profiles.

In accordance with one or more embodiments, a computing platform having at least one processor, a communication interface, and memory may receive, via the communication interface, from a source-level interceptor of a first computing device, a first account-change message. The first account-change message may include information identifying a source account associated with the first computing device and identifying a first target account associated with a target application configured to access a target database. The computing platform may receive, via the communication interface, from a database-level interceptor associated with the target database, a second account-change message. The second account-change message may include information identifying the first target account as a database-level source account and identifying a second target account associated with one or more target databases. Subsequently, the computing platform may generate, based on the first account-change message and the second account-change message, a notification including information associated with an account lineage between the source account and the second target account. The computing platform may send, via the communication interface, to an administrator user computing device associated with the target database, the notification including the information associated with the account lineage between the source account and the second target account.

In some embodiments, the computing platform may determine a first timestamp included in the first account-change message and a second timestamp included in the second account-change message. The first timestamp may indicate a time of accessing the first target account by the source account, and the second timestamp may indicate a time of accessing the target database by the first target account. In some embodiments, the computing platform may determine, based on a comparison of the first timestamp and the second timestamp, a first account lineage segment between the source account and the first target account.

In some embodiments, the computing platform may determine a third timestamp included in the second account-change message. The third timestamp may indicate a time of requesting an account change from the first target account to the second target account. In some embodiments, the computing platform may determine, based on a comparison of the second timestamp and the third timestamp, a second account lineage segment between the first target account and the second target account. The information associated with the account lineage between the source account and the second target account may include information of the first account lineage segment and information of the second account lineage segment.

In some embodiments, the first account-change message may include device information of the first computing device, one or more commands associated with the source account, and one or more timestamps, and the second account-change message may include database information of the target database, one or more commands associated with the target database, and one or more timestamps.

In some embodiments, the computing platform may determine, based on the first account-change message, that the source account is an originating account. In some embodiments, the notification may include information indicating that the source account is an originating account. In some embodiments, the computing platform may cause, based on the source account being an originating account, a grant of an account-change from the first target account to the second target account.

In some embodiments, the computing platform may determine, based on the first account-change message, that the source account is associated with a second source account. The second source account may be associated with a second computing device. In some embodiments, the computing platform may receive, via the communication interface, from a second source-level interceptor of the second computing device, a third account-change message including information identifying the second source account and identifying the source account associated with the first computing device. In some embodiments, the computing platform may generate, based on the first account-change message, the second account-change message, and the third account-change message, information associated with an account lineage between the second source account and the second target account. The notification may include the information associated with the account lineage between the second source account and the second target account.

In some embodiments, the computing platform may determine, based on the third account-change message, that the second source account is an originating account. In some embodiments, the computing platform may cause, based on determining that the source account is not an originating account, a denial of an account-change from the first target account to the second target account. In some embodiments, the second target account may have one or more rights associated with the target database that are unavailable to the first target account.

In some embodiments, the computing platform may receive, via the communication interface, from the database-level interceptor, a third account-change message including information identifying the first target account as a database-level source account and a third target account associated with a second target database. In some embodiments, the computing platform may generate, based on the first account-change message and the third account-change message, a notification including information associated with an account lineage between the source account and the third target account. In some embodiments, the notification may include the information associated with the account lineage between the source account and the third target account.

In some embodiments, the computing platform may receive, via the communication interface, from a second source-level interceptor of a second computing device, a third account-change message including information identifying a second source account associated with the second computing device and identifying the first target account. In some embodiments, the computing platform may determine, based on the first account-change message, a first account lineage segment between the source account and the first target account, determine, based on the second account-change message, a second account lineage segment between the first target account and the second target account, and determine, based on the third account-change message, a third account lineage segment between the second source account and the first target account. In some embodiments, the computing platform may generate an account lineage profile by linking the second account lineage segment to one or more of: the first account lineage segment; or the third account lineage segment.

In some embodiments, the computing platform may receive, via the communication interface, from a second source-level interceptor of a second computing device, a third account-change message including information identifying a second source account associated with the second computing device and identifying the first target account. In some embodiments, the computing platform may generate, based on the first account-change message, the second account-change message, and the third account-change message, a notification indicating a suspicious account-lineage chain among the first target account, the source account, and the second source account.

In some embodiments, the computing platform may determine, based on the first account-change message, device information of the first computing device. The device information of the first computing device may indicate a network identifier associated with the first computing device. In some embodiments, the computing platform may determine, based on the second account-change message, the network identifier associated with the first computing device and verify, based on the device information and the network identifier, that the second account-change message is associated with the first account-change message.

In some embodiments, the computing platform may receive, via the communication interface, from a second source-level interceptor of a second computing device, a third account-change message including information identifying a second source account associated with the second computing device and identifying the source account associated with the first computing device. In some embodiments, the computing platform may cause, based on the second account-change message and the third account-change message, the first computing device to install the source-level interceptor of the first computing device. The first account-change message may be received after installing the source-level interceptor of the first computing device. The one or more target databases may include one or more of: the target database; or a second target database.

In accordance with one or more embodiments, a computing platform having at least one processor, a communication interface, and memory may receive, via the communication interface, from a database-level interceptor associated with a target database, a first account-change message. The first account-change message may include information identifying a first target account as a database-level source account and identifying a second target account associated with one or more target databases. The first target account may be associated with a target application configured to access the target database. The computing platform may determine, based on a failure to detect a source account associated with the first target account, an account lineage chain associated with the first account-change message is incomplete. Subsequently, the computing platform may generate, based on the determining, one or more commands directing a database computing platform associated with the target database to limit access of the first target account to the target database. The computing platform may send, via the communication interface, to the database computing platform associated with the target database, the one or more commands directing the database computing platform associated with the target database to limit access of the first target account to the target database.

In some embodiments, the computing platform may determine a first timestamp included in the first account-change message. The first timestamp may indicate a time of requesting an account change from the first target account to the second target account. The computing platform may determine a second timestamp indicating a time of accessing the target database by the first target account and track, based on a comparison of the first timestamp and the second timestamp, the source account associated with the first target account.

In some embodiments, tracking the source account associated with the first target account may include identifying a network identifier associated with the source account, causing a first computing device associated with the network identifier to install a source-level interceptor, and identifying, based on a communication from the installed source-level interceptor, the source account. In some embodiments, the computing platform may identify a first computing device accessing the first target account, cause the first computing device to install a source-level interceptor, and receive, via the communication interface, from the source-level interceptor, a second account-change message. The second account-change message may include information identifying the source account and identifying the first target account. The second account-change message may include device information of the first computing device, one or more commands associated with the source account, and one or more timestamps. The first account-change message may include database information of the target database, one or more commands associated with the target database, and one or more timestamps. In some embodiments, the computing platform may generate, based on the first account-change message and the second account-change message, a notification including information associated with an account lineage between the source account and the second target account. The computing platform may send, via the communication interface, to an administrator user computing device, the notification including the information associated with the account lineage between the source account and the second target account.

In some embodiments, the computing platform may determine, based on the second account-change message, that the source account is not an originating account and is associated with a second source account of a second computing device, and cause the second computing device to install a second source-level interceptor. In some embodiments, the computing platform may receive, via the communication interface, from the second source-level interceptor, a third account-change message. The third account-change message may include information identifying the second source account and identifying the source account. The computing platform may determine, based on the third account-change message, that the second source account is an originating account, and generate, based on determining that the second source account is an originating account, information indicating a complete account lineage between the second source account and the second target account. In some embodiments, the information indicating the complete account lineage between the second source account and the second target account may indicate a first account lineage segment between the second source account and the source account, a second account lineage segment between the source account and the first target account, and a third account lineage segment between the first target account and the second target account.

In some embodiments, the computing platform may cause, based on an incomplete account lineage chain associated with the first account-change message, a denial of an account-change from the first target account to the second target account. In some embodiments, the second target account may have one or more rights associated with the target database that are unavailable to the first target account.

In some embodiments, the source account may be associated with a first computing device. The computing platform may receive, via the communication interface, from a source-level interceptor associated with a second computing device, a second account-change message. The second account-change message may include information identifying a second source account associated with the second computing device and identifying the source account associated with the first computing device. The computing platform may determine, based on the first account-change message and the second account-change message, that an account lineage chain is incomplete at the first computing device. In some embodiments, the computing platform may cause, based on determining that the account lineage chain is incomplete at the first computing device, the first computing device to install a second source-level interceptor. In some embodiments, the computing platform may generate, based on determining that the account lineage chain is incomplete at the first computing device, information indicating an incomplete account lineage between the source account and the first target account. In some embodiments, the computing platform may send, via the communication interface, to the administrator user computing device, a notification including the information indicating the incomplete account lineage between the source account and the first target account.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 7A-7D depict an illustrative information flow associated with one or more account lineage profiles in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
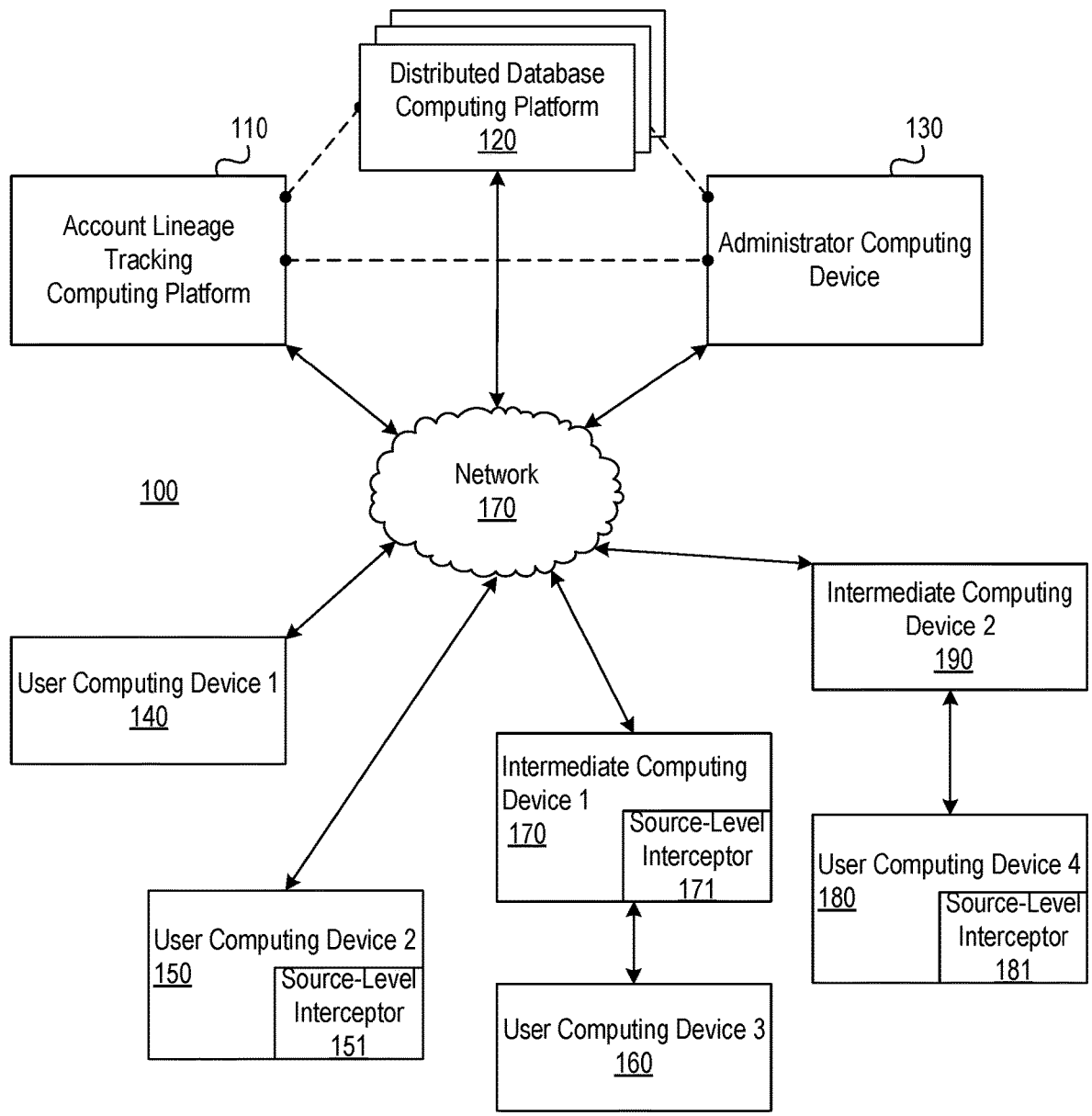
FIGS. 1A-1C depict one or more illustrative computing environments for controlling access to secure information resources using account lineage tracking and verification systems in accordance with one or more example embodiments.
Figure 1B:
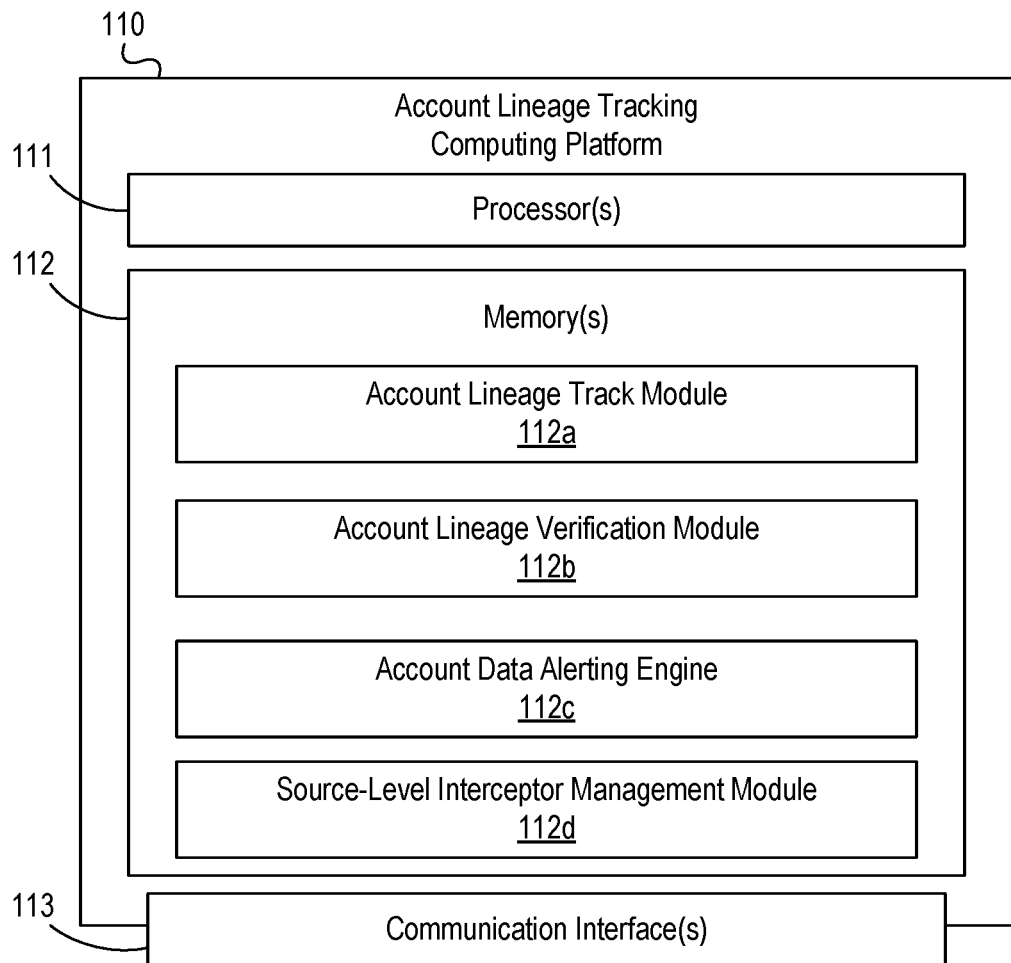
Figure 1C:
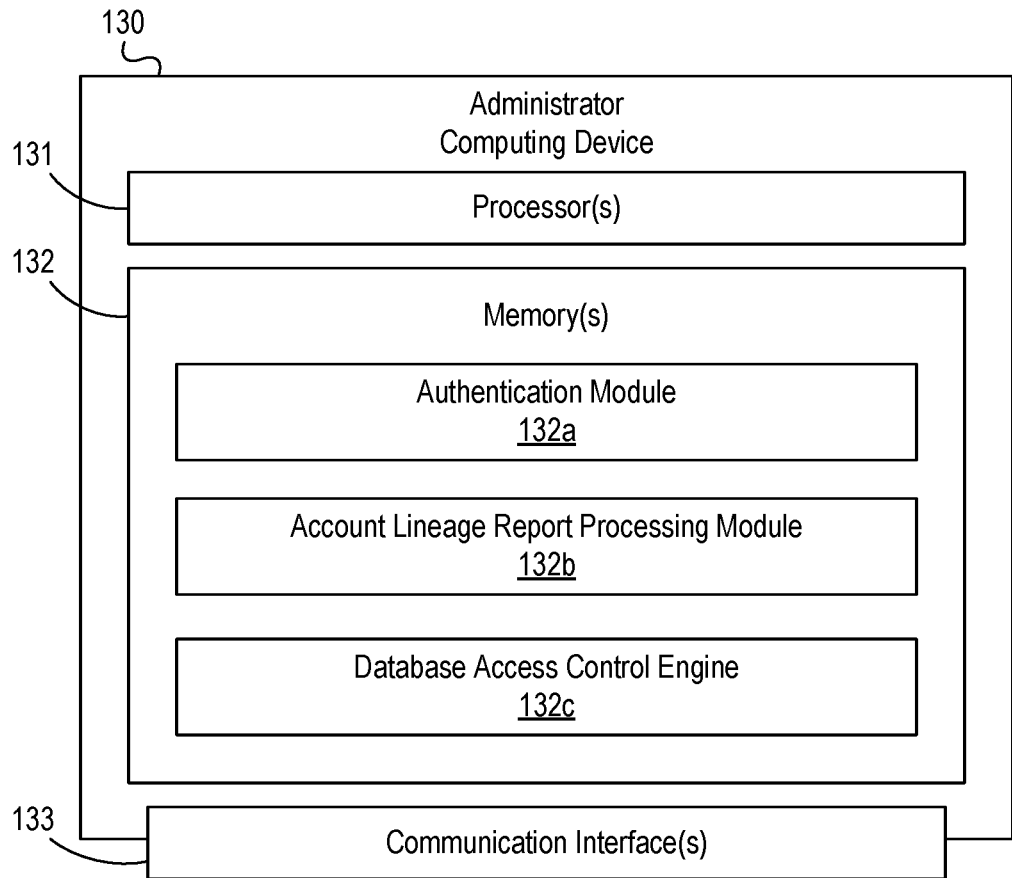

FIGS. 1A-1C depict one or more illustrative computing environments for controlling access to secure information resources using account lineage tracking and verification systems in accordance with one or more example embodiments. Referring to FIG. 1A, computing environment 100 may include one or more computer systems. For example, computing environment 100 may include an account lineage tracking computing platform 110, a distributed database computing platform 120, an administrator computing device 130, user computing device 1 (UCD1) 140, user computing device 2 (UCD2) 150 including a source-level interceptor 151, user computing device 3 (UCD3) 160, intermediate computing device 1 (ICD1) 170 including a source-level interceptor 171, user computing device 4 (UCD4) 180 including a source-level interceptor 181, and intermediate computing device 2 (ICD2) 190. Although not illustrated, one or more additional computing platforms and/or one or more computing devices may communicate with the computing environment 100.

Intermediate computing devices 170, 190 may include various computing devices via which one or more other computing devices may access distributed database computing platform 120. For example, intermediate computing devices 170, 190 may include virtualization servers, host servers, proxy servers, cloud servers, remote access computers, or the like. In some instances, the intermediate computing devices 170, 190 may include one or more user computing devices accessed by another user computing device.

As illustrated in greater detail below, account lineage tracking computing platform 110 may include one or more computing devices configured to perform one or more of the functions described herein. For example, account lineage tracking computing platform 110 may include one or more computers (e.g., laptop computers, desktop computers, servers, server blades, or the like). In some instances, one or more functions and/or operations performed by account lineage tracking computing platform 110 may be initiated on, triggered on, and/or otherwise caused to be executed on other computing device(s)/platform(s).

Account lineage tracking computing platform 110 may include one or more computing devices and/or other computer components (e.g., processors, memories, communication interfaces). In addition, account lineage tracking computing platform 110 may host and/or execute one or more account lineage tracking applications, provide one or more database-level interceptors to one or more databases in distributed database computing platform 120 and one or more source-level interceptors to users of one or more computing devices, and/or generate one or more account lineage profiles associated with distributed database computing platform 120 and/or the one or more computing devices. In one or more arrangements, account lineage tracking computing platform 110 may be associated with an enterprise organization, such as a financial institution, and account lineage tracking computing platform 110 may be connected to other servers and/or enterprise computing infrastructure that is configured to provide various enterprise and/or back-office computing functions for the enterprise organization. For example, this enterprise computing infrastructure may include various servers and/or databases that store and/or otherwise maintain account information, such as financial account information including account balances, transaction history, account owner information, and/or other information. In addition, this enterprise computing infrastructure may process and/or otherwise execute transactions on specific accounts based on commands and/or other information received from other computer systems included in computing environment 100.

Distributed database computing platform 120 may include one or more databases. The one or more databases may include one or more computing devices and/or other computer components (e.g., processors, memories, communication interfaces). In addition, and as illustrated in greater detail below, distributed database computing platform 120 may be configured to store and/or otherwise maintain enterprise data and/or other data, including data that may be used by and/or support one or more transaction processing programs, loan application processing programs, and/or other programs associated with an enterprise organization, such as a financial institution. For example, distributed database computing platform 120 may include various servers and/or databases that store and/or otherwise maintain account information, such as financial account information including account balances, transaction history, account owner information, and/or other information. In addition, distributed database computing platform 120 may process and/or otherwise execute transactions on specific accounts based on commands and/or other information received from other computer systems included in computing environment 100.

Administrator computing device 130 may be a personal computing device (e.g., desktop computer, laptop computer) or mobile computing device (e.g., smartphone, tablet). In addition, administrator computing device 130 may be linked to and/or used by an administrative user (who may, e.g., be an information technology systems administrator of an enterprise organization operating account lineage tracking computing platform 110). For instance, administrator computing device 130 may be linked to and/or used by an administrative user who may use administrator computing device 130 to define one or more policies and/or rules for computing devices and/or databases in an operating environment (which may, e.g., include policies and/or rules governing the access of secured data in one or more databases, changes of access rights and privileges, and/or changes of user accounts). For example, administrator computing device 130 may be used by an administrative user to define one or more criteria for identifying sensitive data that should not be accessed by an unverified source's user account.

User computing devices (e.g., UCD1 140, UCD2 150, UCD3 160, UCD4 180, etc.) may include one or more computing devices and/or other computer components (e.g., processors, memories, communication interfaces). User computing devices may be personal computing devices (e.g., desktop computer, laptop computer) or mobile computing devices (e.g., smartphone, tablet). In addition, a user computing device (e.g., UCD2 150, UCD4 180, etc.) including a source-level interceptor (e.g., source-level interceptor 151, source-level interceptor 181, etc.) may be linked to and/or used by one or more specific users (e.g., a customer, a user, or an employee, who may, e.g., be associated with an enterprise organization, such as a financial institution, operating account lineage tracking computing platform 110 and/or one or more other systems and/or devices in computing environment 100).

Like user computing devices, intermediate computing devices (e.g., ICD1 170, ICD2 190, etc.) may include one or more computing devices and/or other computer components (e.g., processors, memories, communication interfaces). In addition, intermediate computing devices (e.g., ICD1 170) may be linked to and/or used by one or more specific users (e.g., a customer, a user, or an employee, who may, e.g., be associated with an enterprise organization, such as a financial institution, operating account lineage tracking computing platform 110 and/or one or more other systems and/or devices in computing environment 100).

Computing environment 100 also may include one or more networks, which may interconnect one or more of account lineage tracking computing platform 110, distributed database computing platform 120, administrator computing device 130, user computing devices (e.g., UCD1 140, UCD2 150, UCD3 160, and UCD4 180), and intermediate computing devices (e.g., ICD1 170 and ICD2 190). For example, computing environment 100 may include a network 170, which may, for instance, include one or more private networks, public networks, sub-networks, and/or the like, and which may interconnect one or more of account lineage tracking computing platform 110, distributed database computing platform 120, administrator computing device 130, user computing devices (e.g., UCD1 140, UCD2 150, UCD3 160, and UCD4 180), and intermediate computing devices (e.g., ICD1 170 and ICD2 190).

In one or more arrangements, account lineage tracking computing platform 110, distributed database computing platform 120, administrator computing device 130, user computing devices (e.g., UCD1 140, UCD2 150, UCD3 160, and UCD4 180), intermediate computing devices (e.g., ICD1 170 and ICD2 190), and/or the other systems included in computing environment 100 may be any type of computing device capable of receiving a user interface, receiving input via the user interface, and communicating the received input to one or more other computing devices. For example, account lineage tracking computing platform 110, distributed database computing platform 120, administrator computing device 130, user computing devices (e.g., UCD1 140, UCD2 150, UCD3 160, and UCD4 180), intermediate computing devices (e.g., ICD1 170 and ICD2 190), and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of account lineage tracking computing platform 110, distributed database computing platform 120, administrator computing device 130, user computing devices (e.g., UCD1 140, UCD2 150, UCD3 160, and UCD4 180), and intermediate computing devices (e.g., ICD1 170 and ICD2 190) may, in some instances, be special-purpose computing devices configured to perform specific functions.

Referring to FIG. 1B, account lineage tracking computing platform 110 may include one or more processors 111, memory 112, and communication interface 113. A data bus may interconnect processor 111, memory 112, and communication interface 113. Communication interface 113 may be a network interface configured to support communication between account lineage tracking computing platform 110 and one or more networks (e.g., network 170). Memory 112 may include one or more program modules having instructions that when executed by processor 111 cause account lineage tracking computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of account lineage tracking computing platform 110 and/or by different computing devices that may form and/or otherwise make up account lineage tracking computing platform 110. For example, memory 112 may have, store, and/or include an account lineage track module 112a, an account lineage verification module 112b, an account data alerting engine 112c, and a source-level interceptor management module 112d. Account lineage track module 112a may have instructions that direct and/or cause account lineage tracking computing platform 110 to identify one or more account-change instances, to link one or more account-change instances, and to determine an account lineage chain, as discussed in greater detail below. Account lineage verification module 112b may verify one or more account-change instances, one or more accounts associated with the one or more account-change instances, and verify each linkage of the determined account lineage chain. Account data alerting engine 112c may generate one or more notifications and/or alerts for reporting, as discussed in greater detail below. Source-level interceptor management module 112d may manage downloading and installation of one or more types of source-level interceptors, as discussed in greater detail below.

Referring to FIG. 1C, administrator computing device 130 may include one or more processors 131, memory 132, and communication interface 133. A data bus may interconnect processor 131, memory 132, and communication interface 133. Communication interface 133 may be a network interface configured to support communication between administrator computing device 130 and one or more networks (e.g., network 170). Memory 132 may include one or more program modules having instructions that when executed by processor 131 cause administrator computing device 130 to perform one or more functions described herein and/or one or more databases that may store and/or otherwise maintain information which may be used by such program modules and/or processor 131. In some instances, the one or more program modules and/or databases may be stored by and/or maintained in different memory units of administrator computing device 130 and/or by different computing devices that may form and/or otherwise make up administrator computing device 130. For example, memory 132 may have, store, and/or include an authentication module 132a, an account lineage report processing module 132b, and a data access control engine 112c. Authentication module 132a may have instructions that direct and/or cause administrator computing device 130 to authenticate one or more user computing devices and/or intermediate computing devices and to grant installation of a source-level interceptor. Account lineage report processing module 132b may receive one or more reports (e.g., notifications, alerts, etc.) from account lineage tracking computing platform 110, processes information included in the reports, and update one or more databases (e.g., an account lineage profile database), as discussed in greater detail below. Database access control engine 132c may have instructions that direct and/or cause administrator computing device 130 to control access to secure information resources using account lineage data and one or more entitled rights for various different accounts, as discussed in greater detail below.

Figure 2A:
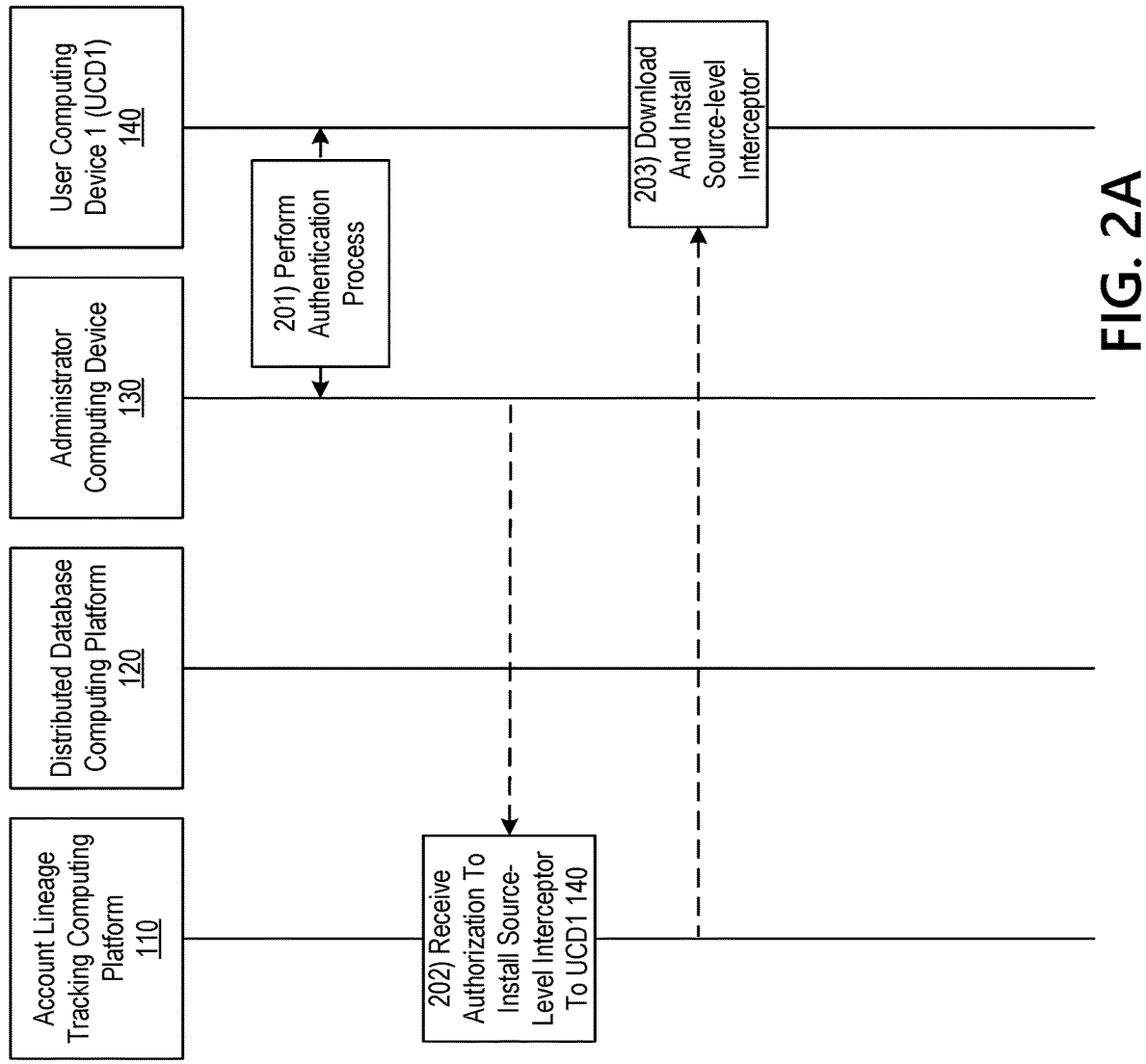
FIGS. 2A-2D depict an illustrative event sequence and account lineage data for controlling access to secure information resources using account lineage tracking and verification in accordance with one or more example embodiments.

FIGS. 2A-2D depict an illustrative event sequence and account lineage data for controlling access to secure information resources using account lineage tracking and verification in accordance with one or more example embodiments. Referring to FIG. 2A, at step 201, administrator computing device 130 may perform an authentication process (e.g., shown in FIG. 2B) with UCD1 140. For example, at step 201, administrator computing device 130 may receive, via a communication interface (e.g., communication interface 133), from UCD1 140, a first data access request to access data of one or more target databases (e.g., secured data stored in distributed database computing platform 120). The access to the data of the one or more target databases may require a verification of a complete account lineage chain, which will be discussed below in more detail. After the authentication process, a source-level interceptor (or a source-level sniffer) may be installed to UCD1 140 to enable the verification of the complete account lineage chain.

At step 202, account lineage tracking platform 110 may receive, from administrator computing device 130, authorization to install a source-level interceptor to UCD1 140. For example, at step 202, based on a successful authentication of UCD1 140 (e.g., by administrator computing device 130), administrator computing device 130 may authorize account lineage tracking platform 110 to install the source-level interceptor to UCD1 140. The source-level interceptor may be installed to other computing devices (e.g., UCD3 160, ICD2 190, etc.) in a similar manner.

In some embodiments, administrator computing device 130 may directly install a source-level interceptor to UCD1 140 after a successful authentication process. For example, administrator computing device 130 may authenticate whether UCD1 140 is used by a preauthorized user (e.g., one or more users preauthorized by a financial institution) to access the secured data of the one or more target databases.

In some embodiments, administrator computing device 130 or account lineage tracking platform 110 may install a source-level interceptor to UCD1 140 without performing step 201. For example, account lineage tracking platform 110 may install a source-level interceptor to UCD1 140 after receiving the first data access request from UCD1 140. The source-level interceptor installed to UCD1 140 may be a public version of an interceptor application that can be installed to any non-private computing devices (e.g., one or more computers used by a plurality of users). The public version may be temporarily installed to UCD1 140 and may be automatically uninstalled or deleted (e.g., after a session is terminated).

At step 203, UCD1 140 may download and install the source-level interceptor. For example, account lineage tracking platform 110 may send a code, a program, and/or software to run the source-level interceptor on UCD1 140. The source-level interceptor may be downloaded and installed on any other computing devices that do not have the source-level interceptor, have a corrupted source-level interceptor, or have an outdated source-level interceptor. The source-level interceptor may be installed as a standalone program, a component code, an embedded code, or any other codes.

The source-level interceptor may be installed on various user computing devices. One or more computing devices (e.g., UCD2 150, ICD1 170, UCD4 180) may include source-level interceptors (e.g., source-level interceptors 151, 171, and 181) installed according to one or more processes described above or similar to the processes described above. In some embodiments, the source-level interceptors may be a generic program that can be installed to a plurality of computing devices.

In some embodiments, each source-level interceptor may be configured to be a user-specific source-level interceptor. For instance, source-level interceptor 151 may be configured to be used only by UCD2 150. Source-level interceptor 151 may authenticate one or more user accounts accessing UCD2 150. Source-level interceptor 171 of ICD1 170 may be configured to be used by one or more computing devices accessing distributed database computing platform 120 via ICD1 170.

In some embodiments, intermediate computing devices (e.g., ICD1 170, ICD2 190) may be one or more of: virtualization servers; host servers; proxy servers; cloud servers; or remote access computers. For example, ICD1 170 or ICD2 190 may be accessed by a plurality of preauthorized users or unauthorized users via other user computing devices (e.g., UCD3 160).

In some embodiments, intermediate computing devices (e.g., ICD1 170) may be a user computing device accessed by UCD3 160. For example, a hacker may illegitimately access ICD1 170 using UCD2 160 to impersonate a user of ICD1 170 to access distributed database computing platform 120 using a user account associated with ICD1 170. In another example, an authenticated user of ICD1 170 may legitimately access ICD1 170 using UCD3 160, which may be another user computing device accessed by the authenticated user.

Figure 2B:
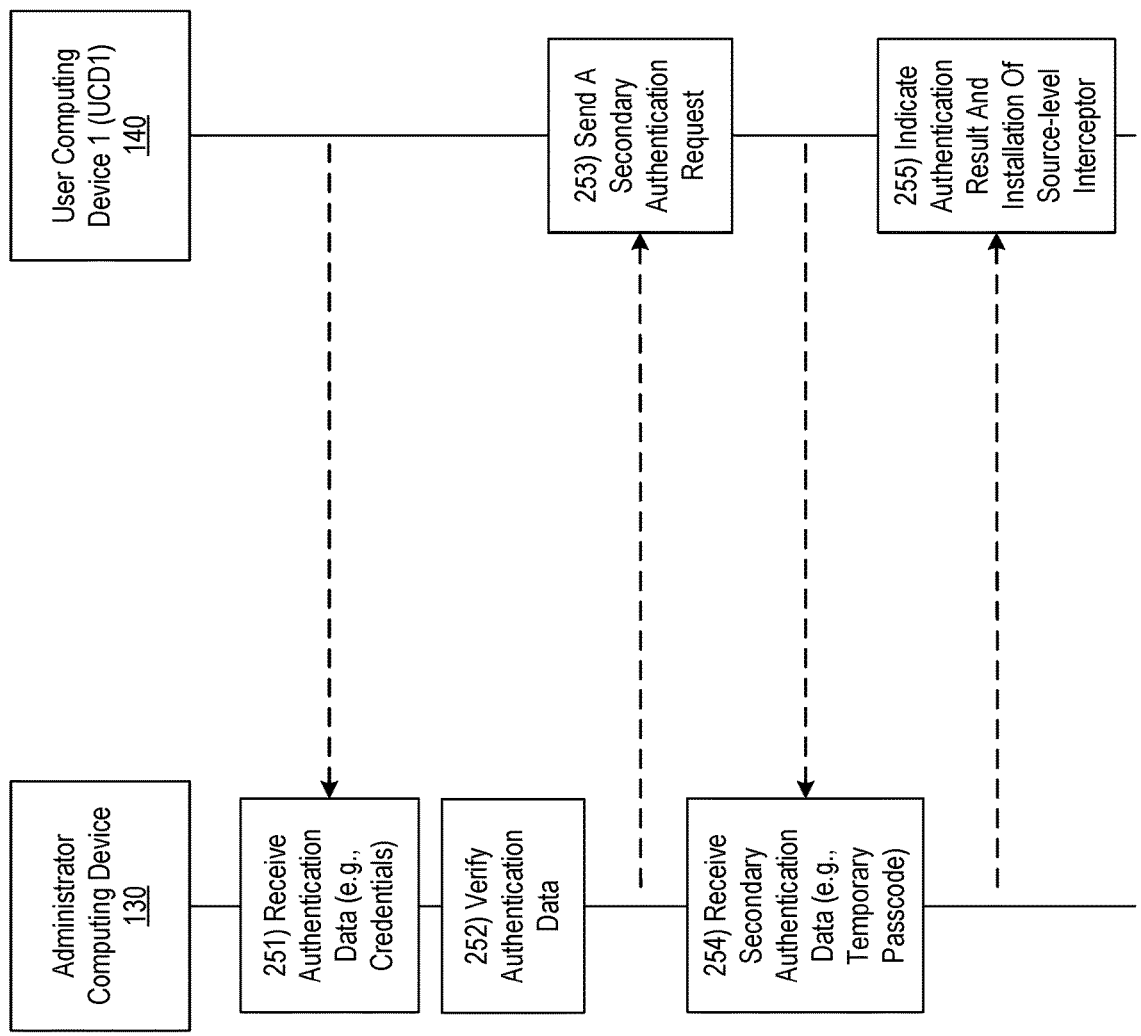

Referring to FIG. 2B, administrator computing device 130 may perform the authentication process with UCD1 140. For example, steps 251, 252, 253, 254, and 255 may be example operations performed during the authentication process illustrated in FIG. 2A (e.g., step 201 shown in FIG. 2A). One or more steps illustrated in FIG. 2B may be omitted or one or more steps may be added in performing the authentication process.

At step 251, administrator computing device 130 may receive, from a user computing device (e.g., UCD1 140), authentication data. For example, administrator computing device 130 may receive authentication data of a user, such as credentials, ID and password, etc. For instance, the authentication data may be registered to administrator computing device 130 based on a creation of a new user account.

At step 252, administrator computing device 130 may verify the authentication data. For example, administrator computing device 130 may verify whether the received authentication data is valid (e.g., not expired). Administrator computing device 130 may verify the authentication data, for instance, by identifying that the authentication data is received from a preauthorized user computing device (e.g., UCD2 150) or an unauthorized user computing device (e.g., UCD1 140). Administrator computing device 130 may verify the authentication data, for instance, by determining whether UCD1 140 has failed the authentication process for more than a number of times (e.g., 3 times, 5 times, etc.).

At step 253, administrator computing device 130 may send a secondary authentication request. For example, administrator computing device 130 may send the secondary authentication request if the authentication data is received from an unauthorized user computing device (e.g., UCD1 140) and/or if UCD1 140 has failed the authentication process for more than a number of times. The secondary authentication request may include a request for temporary identification information. For example, the secondary authentication request may request temporary identification data (e.g., a temporary PIN number) that was sent to an authorized user's account (e.g., an email account, an application account, a text message to a phone number, etc.).

At step 254, administrator computing device 130 may receive secondary authentication data in response to the secondary authentication request. For example, a user of UCD1 140 may input the temporary identification data via a user interface (e.g., a keyboard, a keypad, etc.) of UCD1 140, and administrator computing device 130 may receive, from UCD1 140, the temporary identification data via a communication interface (e.g., communication interface 133).

At step 255, administrator computing device 130 may indicate, to UCD1 140, an authentication result and installation of a source-level interceptor. For example, administrator computing device 130 may receive the temporary identification data within a preset time period and determine that the secondary authentication data is successfully authenticated. Administrator computing device 130 may authorize the installation of the source-level interceptor on UCD1 140 based on the determination that the secondary authentication data is successfully authenticated.

Figure 2C:
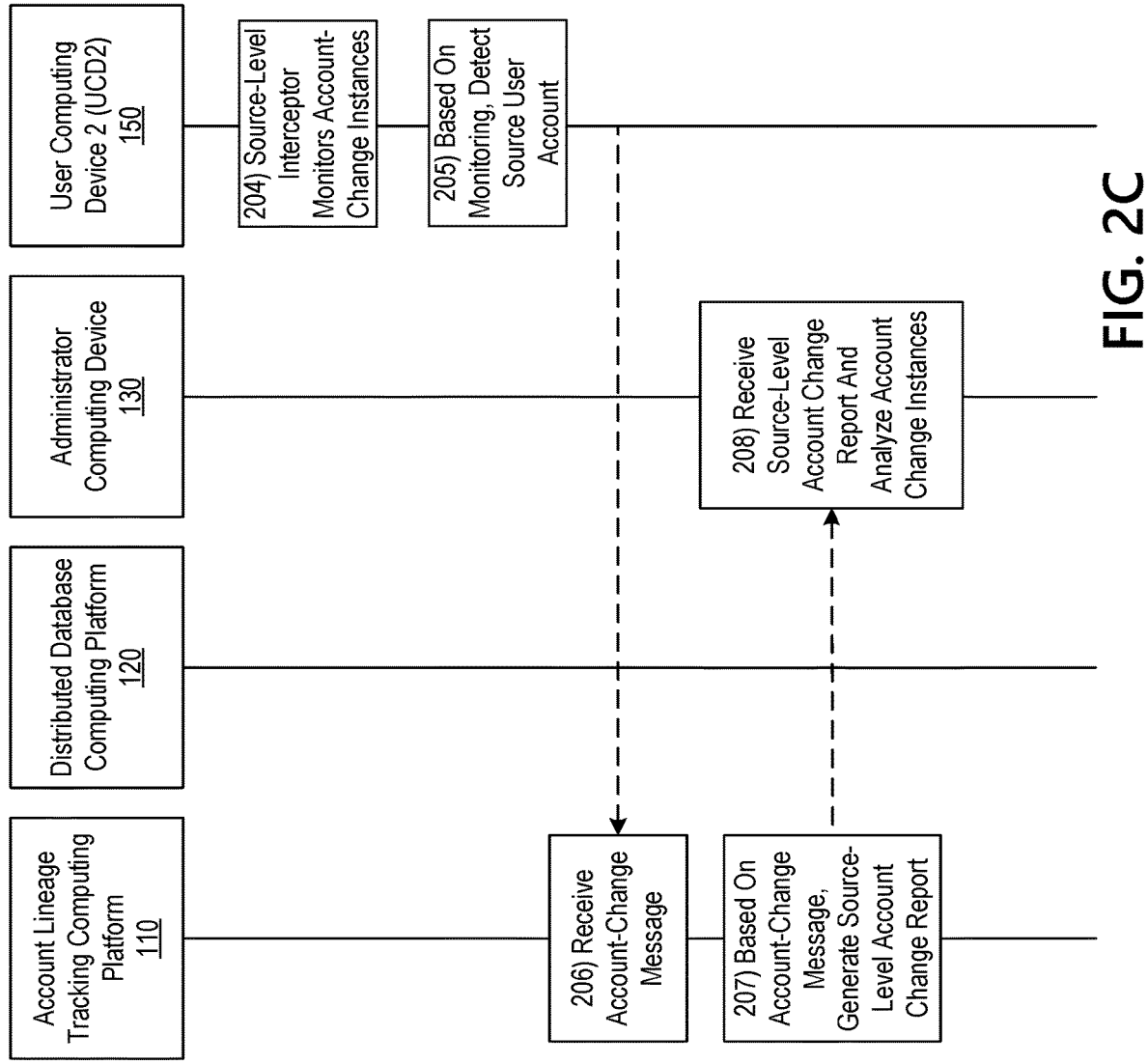

Referring to FIG. 2C, after installing a source-level interceptor (e.g., at step 203 of FIG. 2A), at step 204, a source-level interceptor of a computing device (e.g., UCD1 140 after successfully installing the source-level interceptor, UCD2 150, ICD 170, or UCD4 180) may monitor for account-change instances. For example, the source-level interceptor may examine account usage by the computing device on which the source-level interceptor is installed. The source-level interceptor may gather event data associated with the account usage. The event data may include event data associated with an account change from a first account to a second account and/or one or more commands issued to change an account or to change execution context.

In some embodiments, the account change or the change of execution context may include an identity switching at an operating system level or a network-layer. For example, one or more users may change or switch accounts in UCD2 150 or may execute as another account in UCD2 150. For instance, at a first time, a user of UCD2 150 may initiate a first operating system installed on UCD2 150 and may login into the first operating system using a first user account of the first operating system. At a second time, a user of UCD2 150 may initiate a second operating system installed on UCD2 150 and may login into the second operating system using a second user account of the second operating system. A user of UCD2 150 may access the second operating system, via an interface (e.g., a virtual interface), while executing the first operating system. A user may access one or more applications by using one or more application accounts. The user identity may be changed or switched by using the one or more application accounts. A user may issue one or more commands, such as "execute as" commands, to switch the execution context or to switch the account to another account. The source-level interceptor 151 may monitor for such changes, switches, and/or any context switching of accounts used in UCD2 150.

A database user account may be an account used in one or more databases (e.g., databases of distributed database computing platform 120). For example, a first target database of distributed database computing platform 120 may include a database administrator account (e.g., a super user account of the first target database) and a general database user account (e.g., a database account with limited rights issued to a specific database user of the first target database). A source user account may be a user account tracked by one or more source-level interceptors in one or more computing devices. For example, a source user account may be any user account used externally from the perspective of distributed database computing platform 120.

At step 205, the source-level interceptor (e.g., source-level interceptor 151, source-level interceptor 171, source-level interceptor 181, etc.) may detect one or more source user account events associated with the computing device (e.g., UCD2 150). For example, source-level interceptor 151 may detect the first user account of the first operating system being accessed at the first time, and the second user account of the second operating system being accessed at the second time. Source-level interceptor 151 may detect one or more application accounts being accessed, at UCD2 150, at different times. Source-level interceptor 151 may detect one or more account switching context events associated with one or more commands issued to switch the execution context or to switch the account. Each of an account access event, an account change event, an account switch event, or context switching event may constitute an account-change instance.

The source-level interceptor may generate one or more timestamps associated with the detected events. For example, source-level interceptor 151 may generate a first timestamp corresponding to the first time for the access of the first user account of the first operating system, and generate a second timestamp corresponding to the second time for the access, or the account switch to, the second user account of the second operating system. Source-level interceptor 151 may generate a timestamp corresponding to a time when an application account is accessed. Source-level interceptor 151 may generate a timestamp corresponding to a time when a command is issued to switch the execution context or to switch the account.

The source-level interceptor may detect device information associated with a computing device in which the source-level interceptor is installed. For example, source-level interceptor 151 may detect device information, such as one or more device identifiers of UCD2 150 (e.g., registered account(s) of UCD2 150, installed operating system(s), serial number(s) of UCD2 150 or component(s) of UCD2 150, MAC address(es) of network device(s) of UCD2 150, IP address(es) used by UCD2 150 or other wired/wireless communication interface identifiers, a domain name(s) associated with UCD2 150, gateway(s) associated with UCD2 150, etc.).

At step 206, the source-level interceptor may send an account-change message to account lineage tracking computing platform 110. For example, the account-change message may indicate one or more account-change instances. For instance, a first account-change instance may correspond to the access of the first user account of the first operating system accessed at the first time. A second account-change instance may correspond to the access of the second user account of the second operating system, via an interface of the first operating system, while executing the first operating system. A third account-change instance may correspond to the access of an application account by launching an application (or a web browser or another program or interface) while using the second user account of the second operating system. A fourth account-change instance may correspond to a context switching (e.g., an execution context switching of a session based on one or more commands, such as "execute as" commands).

Figure 2D:
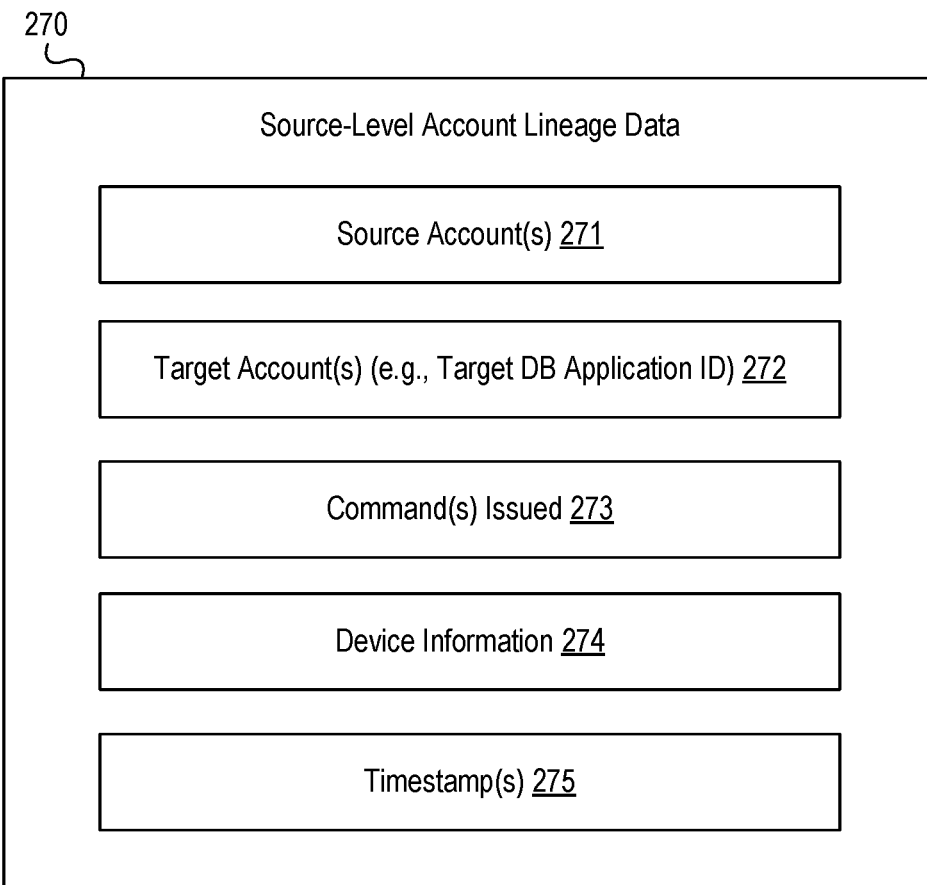

At step 207, account lineage tracking computing platform 110 may generate a source-level account change report. For example, account lineage tracking computing platform 110 may generate a source-level account change report based on one or more account-change messages received from one or more source-level interceptors. As seen in FIG. 2D, for instance, the source-level account lineage report may include source-level account lineage data 270 indicating one or more source user accounts 271 (e.g., the first user account of the first operating system, the second user account of the second operating system (as a source to a target application)), one or more target accounts 272 (e.g., the second user account of the second operating system (as a target from the first user account), the one or more application accounts, one or more target accounts switched based on one or more "executed as" commands), one or more timestamps 275 (e.g., the first timestamp, the second timestamp), the device information 274 (e.g., registered account(s) of UCD2 150, installed operating system(s), serial number(s) of UCD2 150 or component(s) of UCD2 150, MAC address(es) of network device(s) of UCD2 150, IP address(es) used by UCD2 150 or other wired/wireless communication interface identifiers, a domain name(s) associated with UCD2 150, gateway(s) associated with UCD2 150, an host platform identification), and one or more command issued 273 (e.g., one or more "executed as" commands).

The source-level account lineage report may also include information indicating an account lineage chain from a source account to a target account. For example, the source-level account lineage report may include an account lineage from the first user account of the first operating system to a target application account of a target application.

In some embodiments, the source-level account lineage report may include a plurality of account lineage segments. For example, the source-level account lineage report may include a first account lineage segment from an originating account (e.g., the first user account of the first operating system) to a first intermediate account (e.g., the second user account of the second operating system), a second account lineage segment from the first intermediate account (e.g., the second user account of the second operating system) to a second intermediate account (e.g., a third user account switched from the second user account), and a third account lineage segment from the second intermediate account (e.g., the third user account switched from the second user account) to a target account (e.g., a target application account to access distributed database computing platform 120). One or more intermediate accounts may be added or omitted based on the number of account-change instances detected by a source-level interceptor.

At step 208, administrator computing device 130 may receive the source-level account change report and analyze the account-change instances. For example, administrator computing device 130 may analyze the source-level account change report based on previous account-change instances of the same user computing device or previous account-change instances of other computing devices. For instance, the source-level account change report may include one or more account-change instances that are not previously recognized (or atypical) in view of the previous account-change instances, which may be categorized as suspicious account-change instance(s).

Figure 3A:
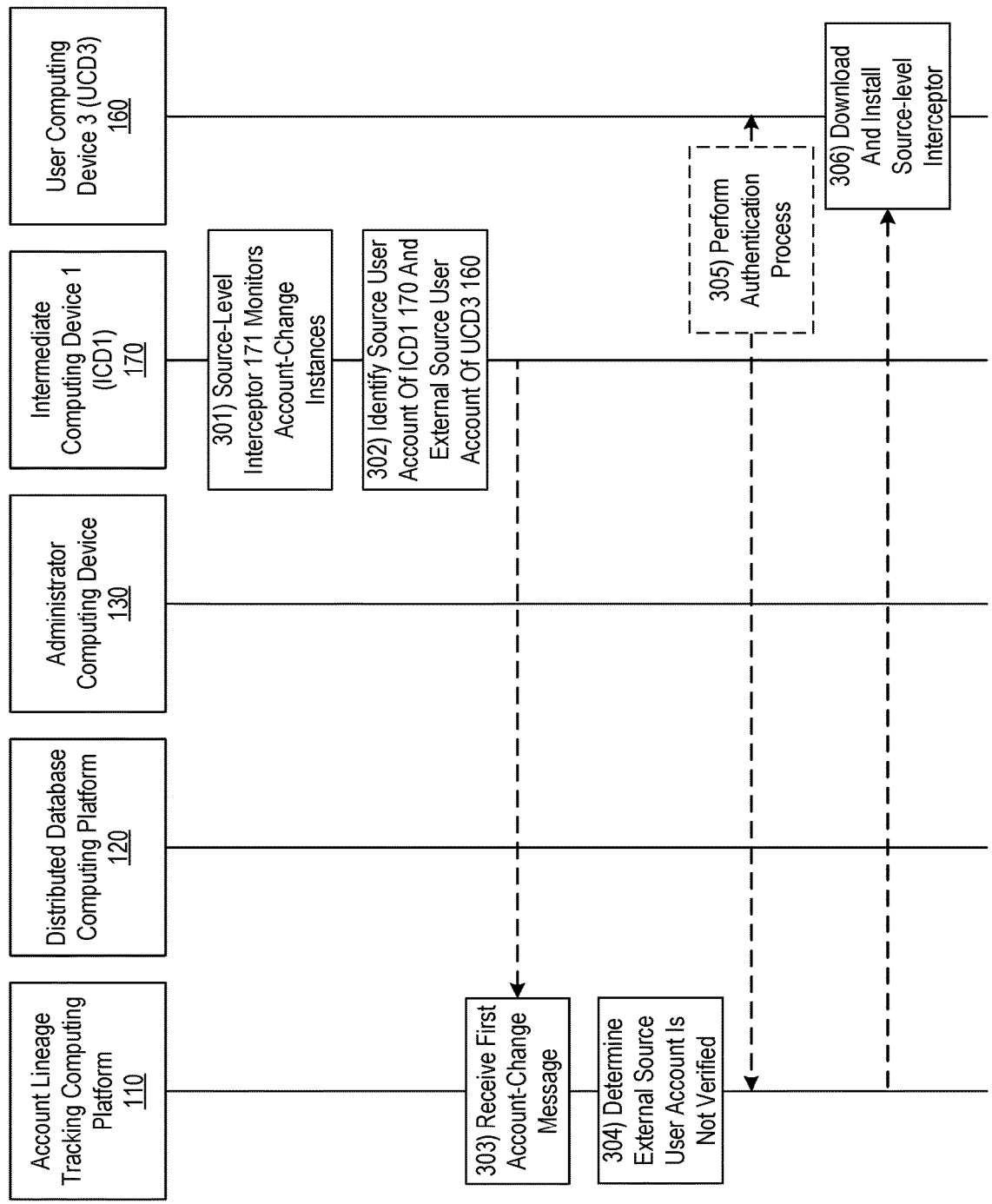
FIGS. 3A-3C depict an illustrative event sequence and notification for controlling access to secure information resources using account lineage tracking and verification involving a plurality of source-level computing devices in accordance with one or more example embodiments.
Figure 3B:
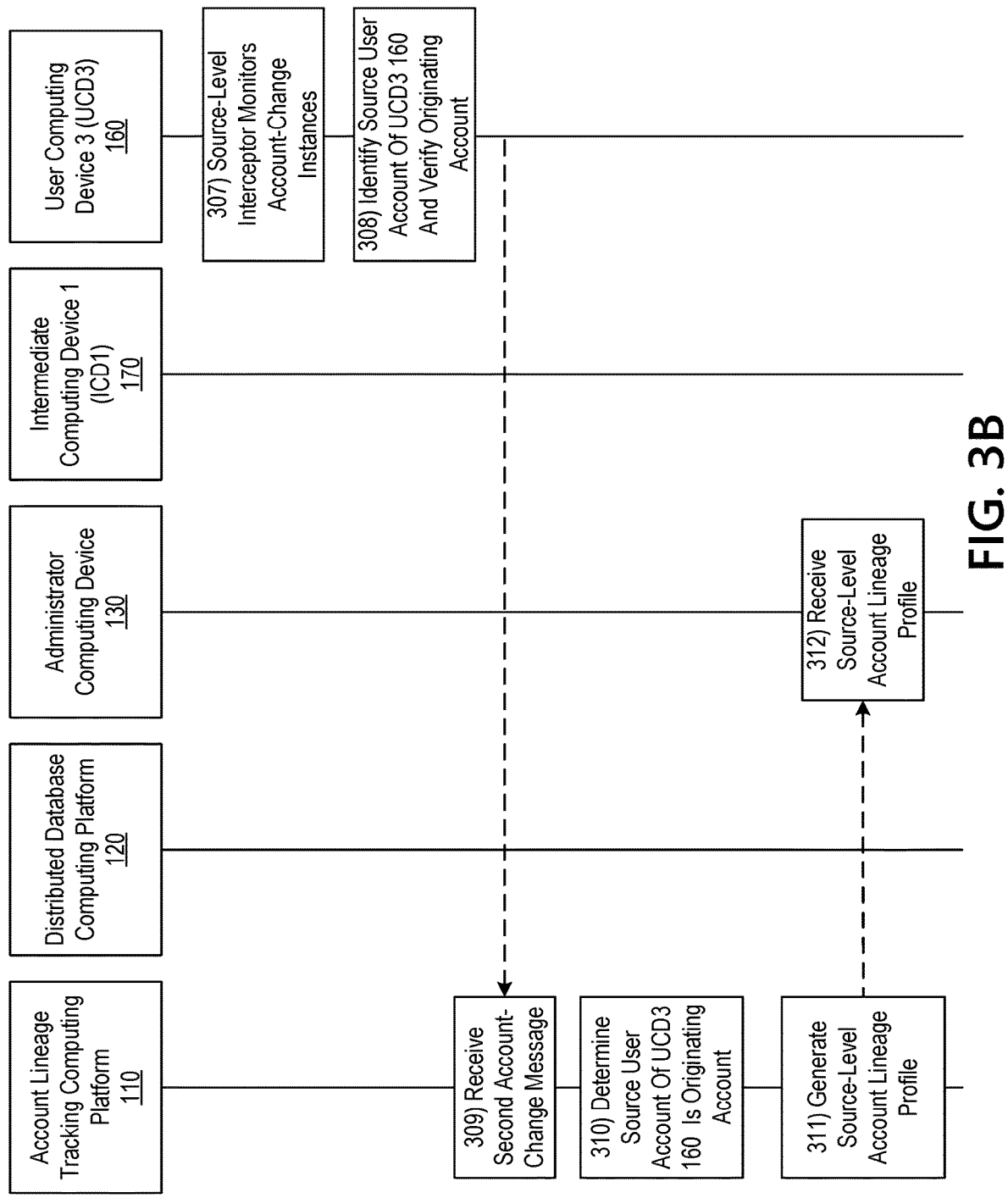
Figure 3C:
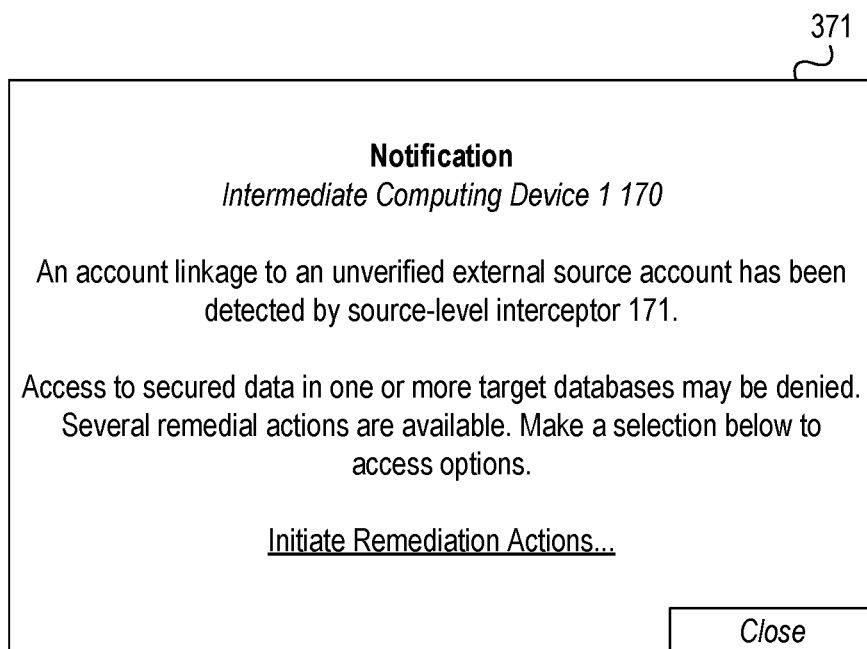

FIGS. 3A-3C depict an illustrative event sequence and notification for controlling access to secure information resources using account lineage tracking and verification involving a plurality of source-level computing devices in accordance with one or more example embodiments. As discussed in greater detail below, the example event sequence illustrated in FIGS. 3A-3B shows how an originating account of UCD3 160 is tracked via one or more intermediate computing devices (e.g., including ICD1 170). Intermediate computing device ICD1 170 may have a source-level interceptor 171, which may be installed based on one or more processes similar to those illustrated in FIGS. 2A-2B. Source-level interceptor 171 may perform one or more processes similar to those discussed above with respect to the source-level interceptor installed on UCD 140. Source-level interceptor 171 may monitor for one or more account-change instances associated with an external computing device, such as UCD3 160. For example, source-level interceptor 171 may track backward to UCD3 160 and determine that a source user account of UCD3 160 attempts to access distributed database computing device platform 120 via ICD1 170. For instance, source-level interceptor 171 may identify a first account-change instance from the source user account of UCD3 160 to a source user account of ICD1 170 and may identify a second account-change instance from the source user account of ICD1 170 to a database application account of ICD1 170 configured to access distributed database computing device platform 120.

FIGS. 3A-3B may be performed after installing source-level interceptor 171 on UCD1 170. The installation of source-level interceptor 171 may be performed by one or more processes similar to those illustrated in FIGS. 2A-2B with respect to UCD1 140. Steps 301, 302, and 303 may be similar to steps 204, 205, and 206, respectively. At step 308, source-level interceptor 171 may additionally identify an external source user account of UCD3 160. One or more source user accounts of UCD3 160 may be traced as discussed below.

Referring to FIG. 3A, at step 301, source-level interceptor 171 of ICD1 170 may monitor for one or more account-change instances. For example, source-level interceptor 171 may be installed on ICD1 170 based on one or more processes similar to those illustrated in FIGS. 2A-2B. Source-level interceptor 171 may monitor for account-change instances in ICD1 170 based on one or more processes similar to those illustrated in FIG. 2C (e.g., step 204).

In some embodiments, UCD3 160 may access ICD1 170 without an access grant by ICD1 170. For instance, UCD3 160 may illegitimately access ICD1 170 and may attempt to impersonate one or more source user accounts associated with ICD1 170.

At step 302, source-level interceptor 171 may detect one or more source user accounts of ICD1 170 and an external source user account of UCD3 160. For example, source-level interceptor 171 may detect one or more accounts in ICD1 170 and an account lineage chain of those detected accounts based on one or more processes similar to those illustrated in FIG. 2C (e.g., step 205). Source-level interceptor 171 may also detect use of the external source user account of UCD3 160 that is linked to one or more of the detected accounts in ICD1 170. For instance, a first remote access application account used by UCD3 160 may gain access to and control of ICD1 170 by receiving an access grant from a second remote access application account used by ICD1 170. The first remote access application account and the second remote access application account may be linked in the account lineage chain of the detected accounts in ICD1 170.

In some embodiments, source-level interceptor 171 may detect one or more network identifiers of UCD3 160 (e.g., IP address(es) used by UCD3 160 to communicate with ICD1 170, MAC address(es) of UCD3 160, etc.). However, source-level interceptor 171 might not detect one or more account-change instances in UCD3 160, and source-level interceptor 171 might not identify one or more source user accounts, of UCD3 160, that can be possibly linked to the first remoted access application account.

At step 303, source-level interceptor 171 may send, to account lineage tracking computing platform 110, a first account-change message. For example, the first account-change message may be sent based on one or more processes similar to those illustrated in FIG. 2C (e.g., step 206). The first account-change message may include information indicating source-level account lineage data similar to source-level account lineage data 270 illustrated in FIG. 2D.

The first account-change message may include information indicating the external source user account of UCD3 160 (e.g., the first remote access application account) and information indicating an additional account lineage element between the external source user account of UCD3 160 and one or more source user accounts (e.g., the second remote access application account) of ICD1 170. The additional account lineage element may indicate the account-change from the external source user account of UCD3 to the one or more source user accounts of ICD1 170.

At step 304, account lineage tracking computing platform 110 may determine that the external source user account of UCD3 160 is not verified. For example, account lineage tracking computing platform 110 may analyze the received first account-change message and may identify that the external source user account of UCD3 160 is linked to one or more source user accounts of ICD1 170. Account lineage tracking computing platform 110 may determine that the external source user account is not verified by checking that a source-level interceptor is not running on a computing device (UCD3 160) that is associated with the external source user account and that an account-change message from UCD3 160 has not been received by account lineage tracking computing platform 110.

At step 305, account lineage tracking computing platform 110 may perform an authentication process with UCD3 160. For example, account lineage tracking computing platform 110 may perform the authentication process with UCD3 160 based on one or more processes similar to those illustrated in FIGS. 2A and 2B (e.g., steps 201 and 251-255).

In some embodiments, account lineage tracking computing platform 110 may identify one or more network identifiers (e.g., IP address(es), MAC address(es), domain name (s), etc.) of UCD3 160 from the first account-change message. For the authentication process, account lineage tracking computing platform 110 may directly or indirectly communicate with UCD3 160 based on the identified one or more network identifiers of UCD3 160. For instance, account lineage tracking computing platform 110 may directly communicate with UCD3 160 or indirectly communicate via ICD1 170.

In some embodiments, as seen in FIG. 3C, source-level interceptor 171 of ICD1 170 may display a notification 371 that indicates the external source user account of UCD3 160 is linked to one or more source user accounts of ICD1 170. The notification may be displayed on a display of ICD1 170 and may also be sent to UCD3 160. For instance, source-level interceptor 171 of ICD1 170 may control the communication channel (e.g., a remote access application associated with the second remote access application account used by ICD1 170) between ICD1 170 and UCD3 160 to communicate with UCD3 160.

In some embodiments, the notification 371 may be displayed if ICD1 170 attempts to access distributed database computing platform 120. For example, as will be illustrated in more detail below, account lineage tracking computing platform 110 may receive, from distributed database computing platform 120, a database-level account-change message indicating the access attempt from an application account (e.g., a target database application account) of ICD1 170 to distributed database computing platform 120. Source-level interceptor 171 of ICD1 170 may detect possible security risk(s) associated with distributed database computing platform 120 when a source user account of an unverified entity, such as UCD3 160, is linked to one or more source user accounts of ICD1 170.

At step 306, account lineage tracking computing platform 110 may cause UCD3 160 to download and install a source-level interceptor. For example, account lineage tracking computing platform 110 may cause UCD3 160 to download and install a source-level interceptor based on one or more processes similar to those illustrated in FIG. 2A (e.g., step 203). UCD3 160 may be instructed to install the source-level interceptor via ICD1 170 or via a direct communication with account lineage tracking computing platform 110. A duplicate (or a variation) of source-level interceptor 171 may be sent to UCD3 160 via ICD 170, for example, if the download is indirectly caused via source-level interceptor 171 of ICD1 170.

In some embodiments, the authentication process of step 205 may be omitted. For example, account lineage tracking computing platform 110 may require all external computing devices that are connected to (or linked, via an account-change, with) ICD1 170 to install a source-level interceptor while ICD1 170 attempts to access distributed database computing platform 120. For instance, the source-level interceptor may be a public version (or a non-user specific version) that can be installed on any computing devices that are not authenticated through an authentication process (e.g., the authentication process at step 305).

Referring to FIG. 3B, at step 307, the source-level interceptor installed on UCD3 160 may monitor for one or more account-change instances occurred in UCD3 160. For example, the source-level interceptor installed on UCD3 160 may monitor for one or more account-change instances occurring in UCD3 160 based on one or more processes similar to those illustrated in FIG. 2C (e.g., step 204).

In some embodiments, the source-level interceptor installed on UCD3 160 may detect one or more past account-change instances that occurred before installation of the source-level interceptor on UCD3 160. For instance, the source-level interceptor installed on UCD3 160 may detect that the first remote access application account used by UCD3 160 attempted to access one or more source user accounts (e.g., the second remote access application account used by ICD1 170).

In some embodiments, the source-level interceptor installed on UCD3 160 might not detect one or more past account-change instances occurred before installation of the source-level interceptor on UCD3 160, for example, if the one or more past account-change instances have been disconnected, expired, and/or unlinked (e.g., UCD3 160 has logged off from the first remote access application account and its session has been expired).

At step 308, the source-level interceptor installed on UCD3 160 may detect one or more source user accounts of UCD3 160 and verify an originating account. For example, the source-level interceptor installed on UCD3 160 may detect one or more source user accounts of UCD3 160 based on one or more processes similar to those illustrated in FIG. 2C (e.g., step 205). For instance, the source-level interceptor installed on UCD3 160 may detect all source user accounts of UCD3 160 based on the one or more detected account-change instances in UCD3 160.

The source-level interceptor installed on UCD3 160 may also detect one or more external source user accounts associated with the one or more source user accounts of UCD3 160. The one or more source user accounts (e.g., the first remote access application account used by UCD3 160) of UCD3 160 may be linked, via an account-change, to a target external account (e.g., the second remote access application account used by ICD1 170).

An account lineage from an originating account (e.g., a source user account of UCD3 160) to a target account of distributed database computing platform 120 may show an account lineage from the originating account to a source user account of ICD1 170, from the source user account of ICD1 170 to a database access application account of ICD1 170, and from the database access application account of ICD1 170 to the target account of distributed database computing platform 120. As shown in FIG. 1A, since the source user account of UCD3 160 is linked to the source user account of ICD1 170 to gain access to distributed database computing platform 120, the source user account of ICD1 170 is a target account from the perspective of the source user account of UCD3 160, and the source user account of UCD3 160 is a source account from the perspective of the source user account of ICD1 170. Likewise, since the first remote access application account used by UCD3 160 may be linked to the second remote access application account used by ICD1 170 to gain access to distributed database computing platform 120, the second remote access application account used by ICD1 170 is a target account from the perspective of the first remote access application account used by UCD3 160, and the first remote access application account used by UCD3 160 is a source account from the perspective of the second remote access application account used by ICD1 170.

At step 309, the source-level interceptor of UCD3 160 may send, to account lineage tracking computing platform 110, a second account-change message. For example, the second account-change message may be sent based on one or more processes similar to those illustrated in FIG. 2C (e.g., step 206) or FIG. 3A (e.g., step 303). The second account-change message may include information indicating source-level account lineage data similar to source-level account lineage data 270 illustrated in FIG. 2D.

In some embodiments, account lineage tracking computing platform 110 may determine that the first account-change message is associated with the second account-change message. For example, the first account-change message may include information indicating that a first source user account of UCD3 160 is accessing a second source user account of ICD1 170. The first account-change message may also identify the network identifier(s) of UCD3 160. The second account-change message may include information indicating that the first source user account of UCD3 160 is accessing the second source user account of ICD1 170. The second account-change message may also identify the network identifier(s) of UCD3 160. Further, as described herein, one or more timestamps included in each of the first account-change message and the second account-change message may be compared to determine the association between the first account-change message and the second account-change message.

At step 310, account lineage tracking computing platform 110 may determine that one of the one or more source user accounts of UCD3 160 is an originating account. For example, the second account-change message may indicate that no additional source user account of another computing device (other than ICD1 170) is linked to UCD3 160. For instance, UCD3 160 may be the end node in the account lineage chain among UCD3 160, ICD1 170, and distributed database computing platform 120.

At step 311, account lineage tracking computing platform 110 may generate a source-level account lineage profile. For example, account lineage tracking computing platform 110 may generate the source-level account lineage profile based on the first account-change message and the second account-change message. The source-level account lineage profile may indicate information of an account lineage from an originating account of UCD3 160 to one or more source user accounts of ICD1 170 including a source user account of ICD1 170 that accesses distributed database computing platform 120. For instance, the source-level account lineage profile may include information to indicate source-level portions 770 of the account lineage illustrated in FIG. 7D (from user account1 of UCD3 160 to App account1, from the App account1 to user account of ICD1 170, and from the user account of ICD1 170 to target DB1 App account1).

At step 312, administrator computing device 130 may receive the source-level account lineage profile. For example, based on the source-level account lineage profile, administrator computing device 130 may generate (e.g., reproduce) and display account lineage data. For instance, administrator computing device 130 may reproduce the account lineage data illustrated in FIGS. 7A-7D. Administrator computing device 130 may manage an account lineage profile database and update the account lineage profile database with newly received account lineage data profiles. Based on the account lineage profile database, administrator computing device 130 may analyze account-change trends at various source levels (and database levels, as discussed in greater detail below).

Although FIGS. 3A-3B illustrates only one intermediate computing device, ICD1 170, one or more additional intermediate computing devices may exist between distributed database computing platform 120 and ICD1 170. For example, a user of UCD3 160 may use a source user account of UCD3 160 to access a database of distributed database computing platform 120 via a plurality of intermediate computing devices using a plurality of account change instances. As discussed above, UCD3 160 may access ICD1 170. ICD1 170 may access an intermediate computing device A, which may access an intermediate computing device B. The intermediate computing device B may access distributed database computing platform 120. As will be discussed in more detail below, a database-level interceptor of the database of distributed database computing platform 120 may determine that the intermediate computing device B attempts to access the database of distributed database computing platform 120, and cause the intermediate computing device B to install a source-level interceptor. The source-level interceptor of the intermediate computing device B may monitor for one or more account-change instances, determine that the attempt to access the database of distributed database computing platform 120 is originated from the intermediate computing device A, and cause the intermediate computing device A to install a source-level interceptor. The source-level interceptor of the intermediate computing device A may monitor for one or more account-change instances, determine that the attempt to access the database of distributed database computing platform 120 is originated from ICD1 170, and cause ICD 170 to install source-level interceptor 171. As discussed above, source-level interceptor 171 may monitor for one or more account-change instances, determine that the attempt to access the database of distributed database computing platform 120 is originated from UCD3 160, and cause UCD 160 to install a source-level interceptor. The source-level interceptor of UCD 3 160 may determine that a source user account of UCD 3 160 is an originating account and report the originating account to account lineage tracking computing platform 110.

Figure 4A:
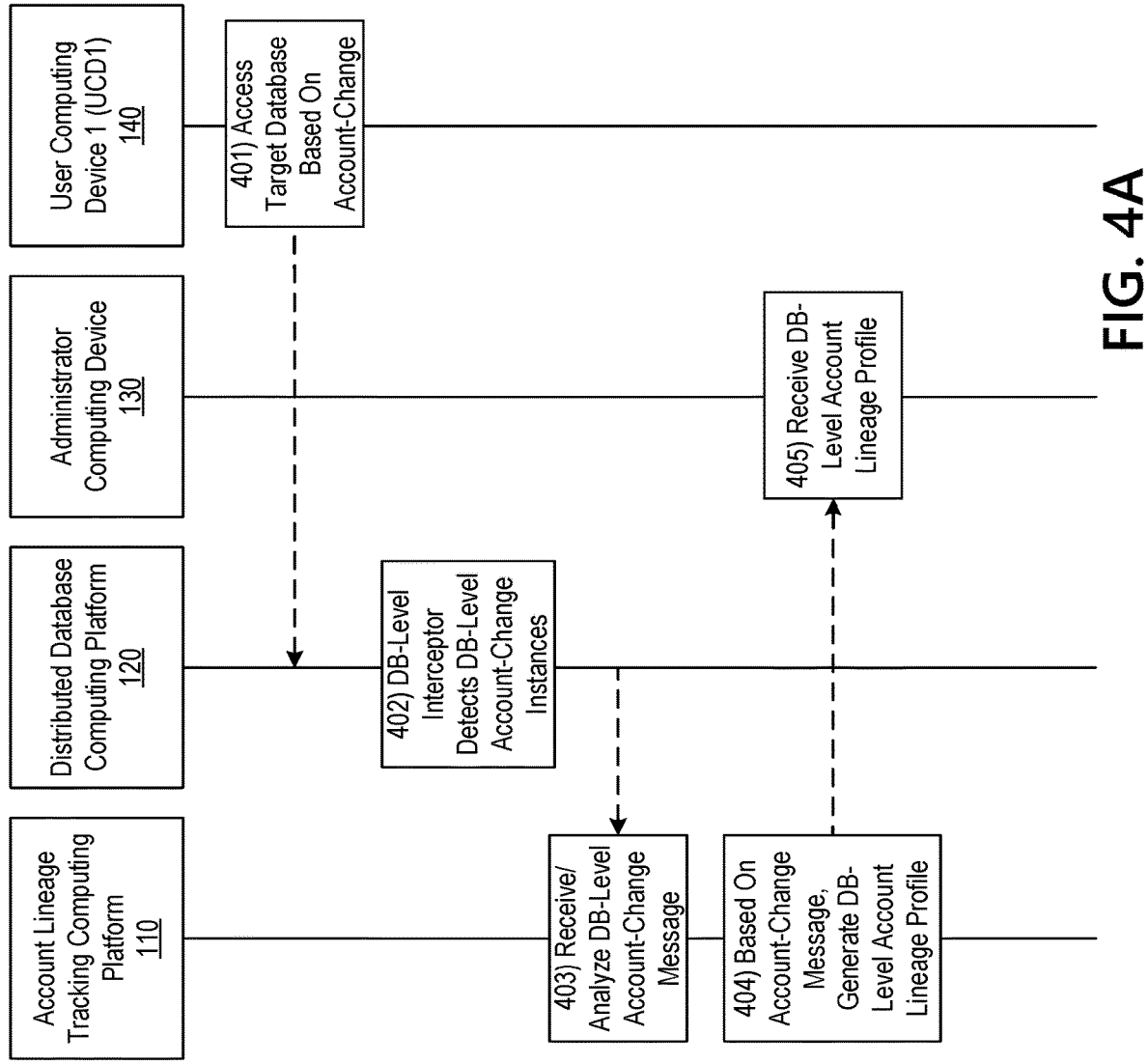
FIGS. 4A-4D depict another illustrative event sequence and account lineage data for controlling access to secure information resources using account lineage tracking and verification in accordance with one or more example embodiments.

FIGS. 4A-4D depict another illustrative event sequence and account lineage data for controlling access to secure information resources using account lineage tracking and verification in accordance with one or more example embodiments. Referring to FIG. 4A, account lineage tracking computing platform 110 may receive a database-level account-change message from distributed database computing platform 120 and may generate a database-level account lineage profile. At step 401, UCD1 140 may attempt to access one or more target databases of distributed database computing platform 120. For example, a user of UCD1 140 may attempt to access a first database of distributed database computing platform 120 by logging into a database user account of a database access application configured to access the first database. Distributed database computing platform 120 may receive a request for accessing the first database from UCD1 140 via the database access application.

Distributed database computing platform 120 may detect one or more identifiers associated with the request. For example, distributed database computing platform 120 may detect one or more network identifiers (e.g., IP address(es), MAC address(es), etc.) associated with UCD1 140 and may detect the database user account of the database access application. Based on the request and/or the database user account of the database access application, distributed database computing platform 120 may grant UCD1 140 to access the first database of distributed database computing platform 120.

At step 402, a database-level interceptor may detect one or more account-change instances in the first database. For example, each database of distributed database computing platform 120 may include a database-level interceptor. The database-level interceptor in each database may be configured as a database-specific interceptor in accordance with different syntaxes and database structures. For instance, different databases of distributed database computing platform 120 may be implemented with different identity configurations and data structures in association with database account changes and switching. Each database-level interceptor may detect an account-change or context switching (e.g., including execution context switching caused by one or more commands such as "execute as") at a specific database level.

Figure 4B:
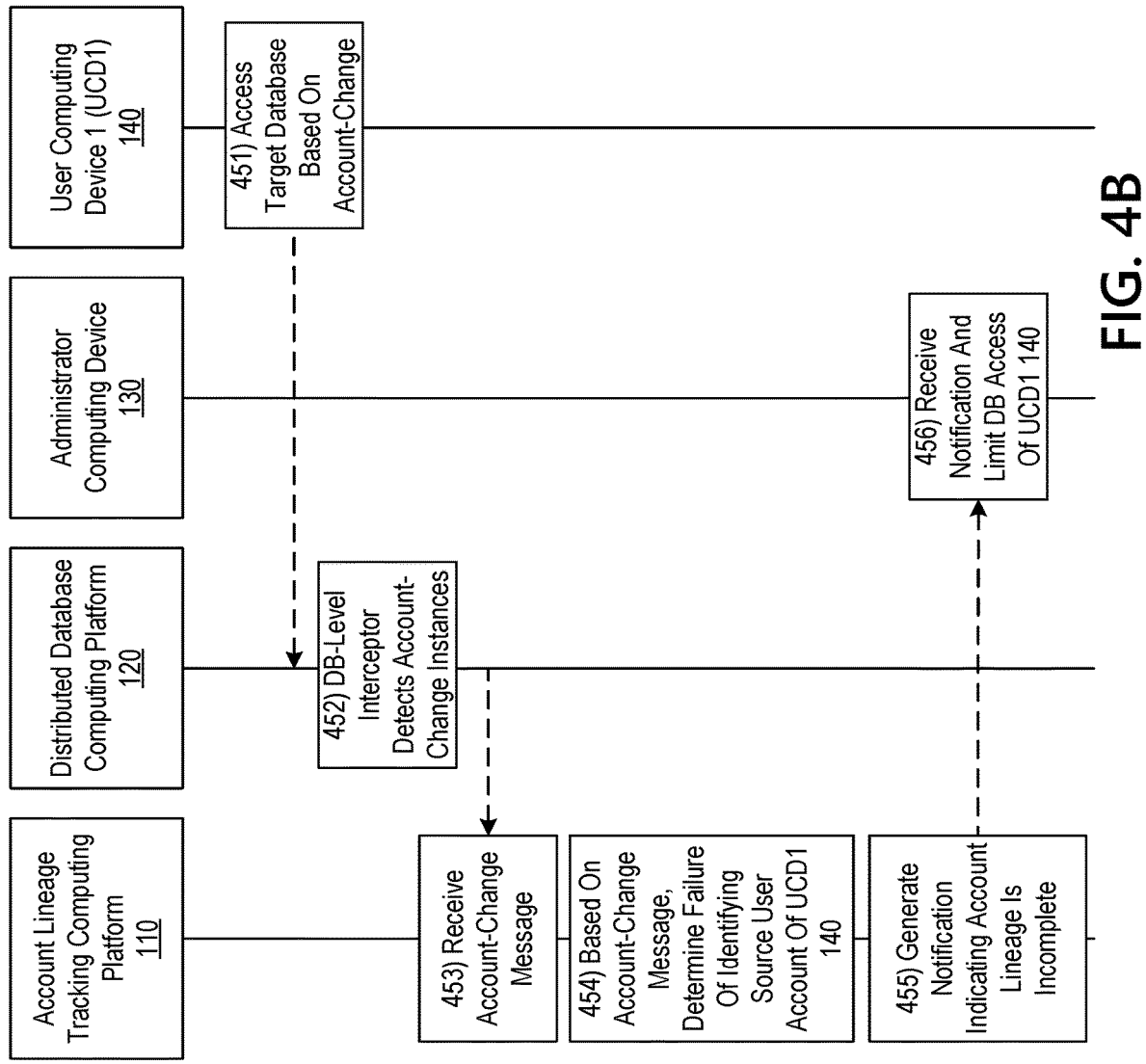
Figure 4C:
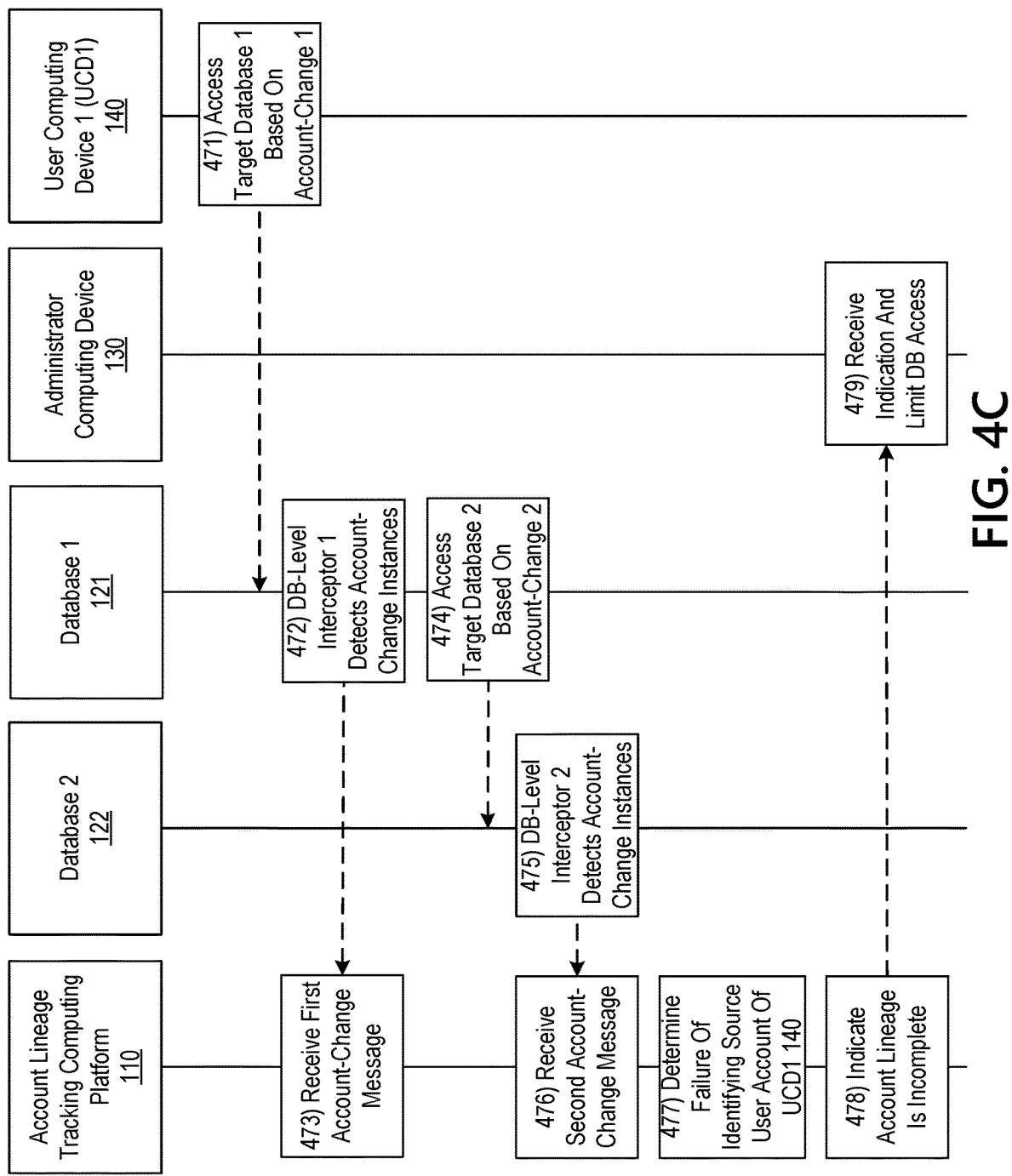
Figure 4D:
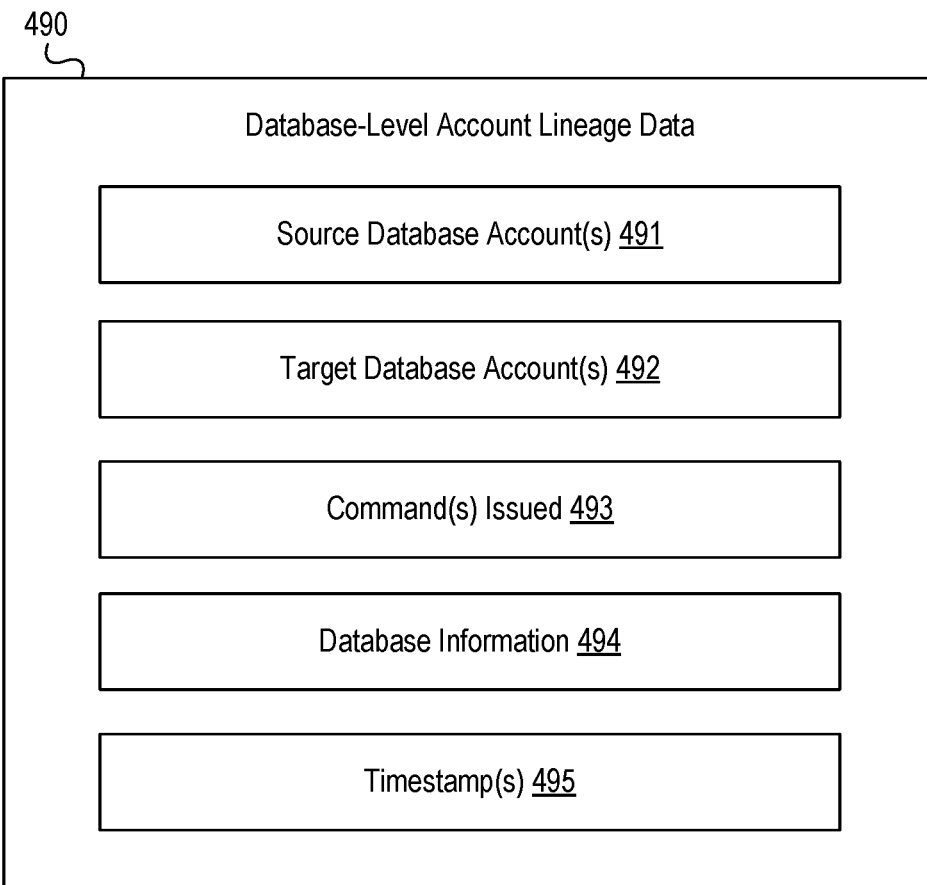

Each database-level interceptor may generate a database-level account-change message based on the one or more database-level account-change instances occurring in the respective database. The database-level account-change message may be in a database agnostic format. For example, a plurality of databases of distributed database computing platform 120 may have different database syntaxes and database structures, but they may generate account-change messages in the same format. The database-level account-change message may include information indicating database-level account lineage data (e.g., database-level account lineage data 490 illustrated in FIG. 4D). As seen in FIG. 4D, for instance, the database-level account lineage data 490 may indicate one or more source database accounts 491 (e.g., the database user account to access the first database), one or more target database accounts 492 (e.g., a database administrator account, one or more target database accounts switched based on one or more "executed as" commands), one or more timestamps 495 (e.g., a third timestamp associated with a time when the database user account accesses the first database, a fourth timestamp associated with a time when the database user account is switched to another database account), the database information 494 (e.g., database identifier(s), database version(s), etc.), and one or more command issued 493 (e.g., one or more "executed as" commands).

At step 403, account lineage tracking computing platform 110 may receive the database-level account-change message from distributed database computing platform 120. For example, account lineage tracking computing platform 110 may receive the database-level account-change message and analyze the information indicating database-level account lineage data. Account lineage tracking computing platform 110 may analyze account-change messages of a plurality of databases of distributed database computing platform 120.

At step 404, account lineage tracking computing platform 110 may generate a database-level account lineage profile based on one or more database-level account change messages. For example, the database-level account lineage profile may indicate information of an account lineage from a database user account to another database account (e.g., a database administrator account). For instance, the database-level account lineage profile may include information to indicate database-level portions 771 of the account lineage illustrated in FIG. 7A (from a target DB1 App account1 to a target DB1 App account2). The target DB1 App account1 may be the database access application account of ICD1 170 for accessing the first database (e.g., database1 121 illustrated in FIG. 7A). The target DB1 App account2 may be the database administrator account of the first database. As seen in FIG. 7A, a database-level interceptor of database1 121 might not be aware of the user account of ICD1 170 that accessed the target DB1 App account1. Distributed database computing platform 120 may identify the one or more network identifiers and one or more timestamps (e.g., TS3 indicating a time when the user account of ICD1 170 accessed the target DB1 App account1). However, distributed database computing platform 120 might not be aware of one or more source user accounts of ICD1 170 that are possibly linked to the target DB1 App account1. The account lineage chain between database1 121 and ICD1 170 may be incomplete (e.g., broken) as illustrated in FIG. 7A until one or more source-level interceptors report one or more source-level account change messages and the one or more source-level account change messages are analyzed by account lineage tracking computing platform 110.

At step 405, account lineage tracking computing platform 110 may send the database-level account lineage profile to administrator computing device 130. For example, based on the database-level account lineage profile, administrator computing device 130 may generate (e.g., reproduce) and display account lineage data at the database level. For instance, administrator computing device 130 may reproduce the account lineage data illustrated in FIGS. 7A-7D. Administrator computing device 130 may manage the account lineage profile database and update the account lineage profile database with newly received database-level account lineage data profiles. Based on the account lineage profile database, administrator computing device 130 may analyze account-change trends at various database levels.

Account lineage tracking computing platform 110 may detect an incomplete account lineage chain and cause administrator computing device 130 to limit (or restrict, ban, deny, etc.) a database access request based on the incomplete account lineage chain. Referring to FIG. 4B, at step 451, UCD1 140 may attempt to access a target database of distributed database computing platform 120. For example, UCD1 140 may attempt to access the target database based on an account change. For instance, a user of UCD1 140 may use a source user account of an operating system of UCD1 140 and use a database user account of a database application configured to access the target database. Distributed database computing platform 120 may detect the database user account but might not be aware of the source user account.

At step 452, a database-level interceptor of the target database may detect one or more database-level account change instances. For example, the database-level interceptor of the target database may detect an attempt to switch from the database user account to a database administrator account. Distributed database computing platform 120 may generate a database-level account-change message based on the one or more database-level account change instances detected by the database-level interceptor of the target database.

At step 453, account lineage tracking computing platform 110 may receive the database-level account-change message from distributed database computing platform 120. For example, distributed database computing platform 120 may receive information of the one or more database-level account change instances from the database-level interceptor of the target database. The database-level account-change message may include one or more network identifiers of UCD1 140 corresponding to its attempts to access the target database.

At step 454, account lineage tracking computing platform 110 may determine a failure of detecting the source user account of UCD1 140. For example, UCD1 140 might not have a source-level interceptor, and might not send a source-level account-change message to account lineage tracking computing platform 110.

At step 455, account lineage tracking computing platform 110 may generate a notification indicating an account lineage is incomplete. For example, the notification may indicate that an originating account of a user computing device that requests the database-level account-change instance (e.g., from the database user account to the database administrator account) has not been identified or verified.

At step 456, administrator computing device 130 may receive the notification indicating an account lineage is incomplete and may limit a database access of UCD1 140. For example, administrator computing device 130 may cause distributed database computing platform 120 to reject the database-level account change (e.g., from the database user account to the database administrator account) and/or limit one or more rights of the database user account in the target database. For instance, the database user account may be locked and might not be used for accessing the target database until the locked account is successfully unlocked based on an authentication process (e.g., the authentication process illustrated in FIGS. 2A-2B)

Account lineage tracking computing platform 110 may detect one or more account-change instances between databases in distributed database computing platform 120. Referring to FIG. 4C, at step 471, UCD1 140 may access database1 121 based on a first account change (account-change 1). For example, UCD1 140 may use a first database application account to access database1 121. The first account change may be an account-change from a first source user account (e.g., an originating account) of UCD1 140 to the first database application account.

At step 472, a database-level interceptor1 of database1 121 of distributed database computing platform 120 may detect one or more database-level account-change instances in database1 121. For example, database-level interceptor1 may detect an account-change instance from the first database application account to a second database account (e.g., a database account configured to access a plurality of databases of distributed database computing platform 120).

At step 473, database-level interceptor1 of database1 121 may send a first account-change message indicating the one or more database-level account-change instances. For example, the account-change instance from the first database application account to a second database account may be indicated by the first account-change message. At step 474, the second database account accessed by UCD1 140 may access database2 122 based on a second account change (account-change 2). Database-level interceptor1 of database1 121 may also detect the second account change. Database-level interceptor1 of database1 121 may send another account-change message indicating the second account change. For example, database-level interceptor1 of database1 121 may indicate that the second database account accesses database 2 based on the second account change.

At step 475, a database-level interceptor2 of database2 122 may detect one or more database-level account-change instances in database2 122. For example, database-level interceptor2 may detect the account-change from database1 121 to database2 122 using the second database account. At step 476, database-level interceptor2 may send a second account-change message indicating the account change from database1 121 to database2 122 using the second database account.

At step 477, account lineage tracking computing platform 110 may determine a failure of detecting source user account of UCD1 140. As discussed above, account lineage tracking computing platform 110 may determine that the first account-change message is associated with the second account-change message, based on comparing information included in the first account-change message and the second account-change message (e.g., one or more timestamps, device information, one or more network identifiers, source accounts, target accounts, etc.). Account lineage tracking computing platform 110 may determine, based on the first account-change message and the second account-change message, an account lineage chain from the first database application account to the second database account that accesses database2 122. However, account lineage tracking computing platform 110 might not detect use of the source user account of UCD1 140. For example, UCD1 140 might not have a source-level interceptor, and account lineage tracking computing platform 110 might not receive a source-level account-change message associated with the first account-change message or the second account-change message. Account lineage tracking computing platform 110 may determine an incomplete account lineage chain by determining a failure of detecting the source user account of UCD1 140.

At step 478, account lineage tracking computing platform 110 may indicate, to administrator computing device 130, that an account lineage chain is incomplete. At step 479, administrator computing device 130 may receive the indication that an account lineage chain is incomplete and may limit access to a database by the first database application account and/or the second database account.

Figure 5:
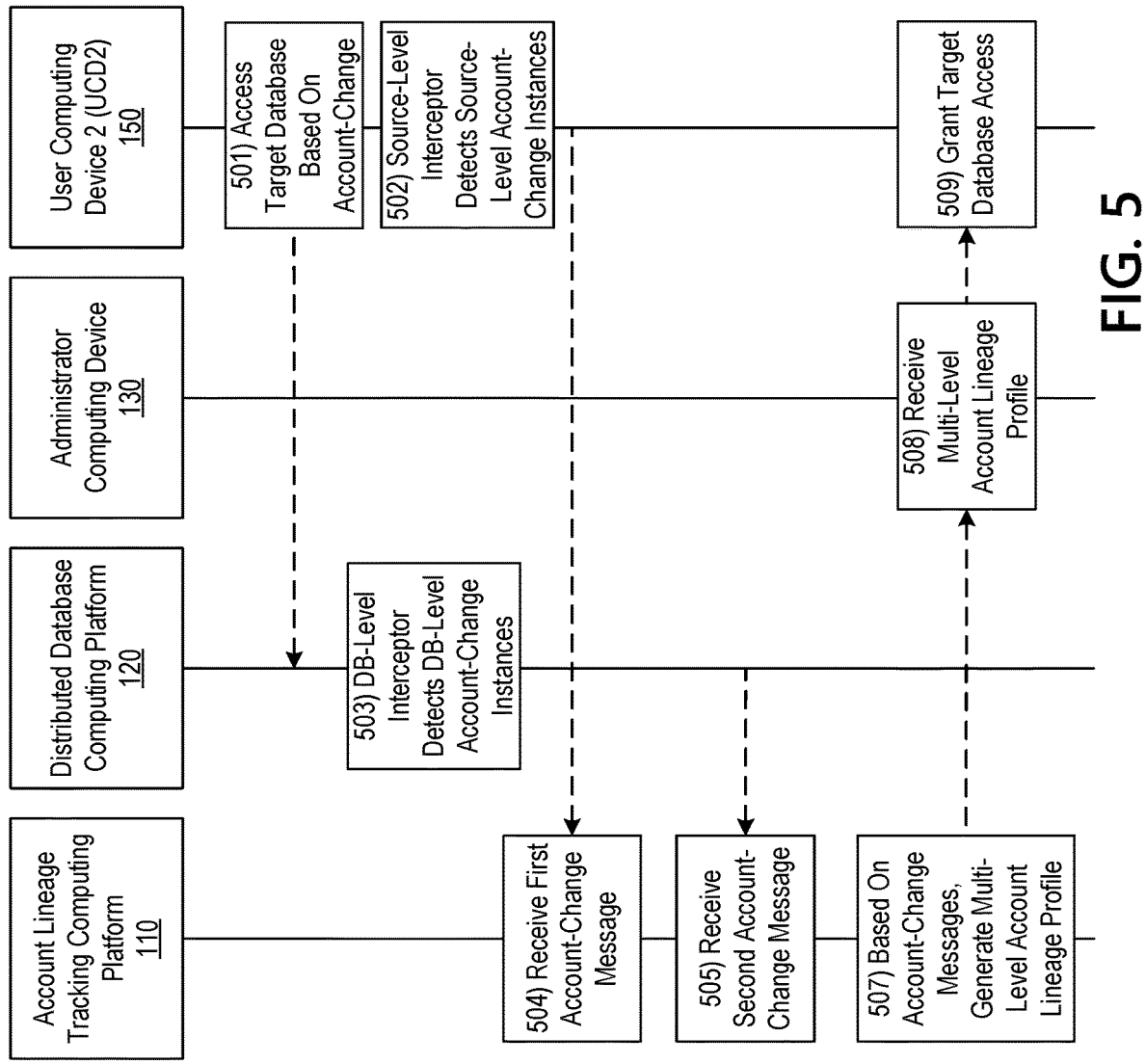
FIG. 5 depicts another illustrative event sequence for controlling access to secure information resources using account lineage tracking and verification in accordance with one or more example embodiments.

FIG. 5 depicts another illustrative event sequence for controlling access to secure information resources using account lineage tracking and verification in accordance with one or more example embodiments. One or more processes illustrated in FIG. 5 may be similar to those discussed above. For example, UCD2 150 may perform steps 502 and 504, which may be similar to steps 308 and 309, respectively, or may be similar to steps 205 and 206, respectively. For example, distributed database computing platform 120 may perform steps 503 and 505, which may be similar to steps 402 and 403, respectively. Account lineage tracking computing platform 110 receives account-change messages both from source-level interceptor(s) (e.g., as shown in FIGS. 2A-2C and 3A-3B) and database-level interceptors (e.g., as shown in FIGS. 4A-4C) to determine a complete account lineage chain.

Referring to FIG. 5, at step 501, UCD2 150 may access a target database of distributed database computing platform 120 based on an account change (e.g., from a source user account of UCD2 150 to a database user account to access the target database). At step 502, source-level interceptor 151 of UCD2 150 may detect source-level account-change instances (e.g., the account change from the source user account of UCD2 150 to a database user account to access the target database). At step 503, a database-level interceptor of the target database of distributed database computing platform 120 may detect database-level account-change instances (e.g., the database user account accessing the target database from an external computing device (UCD2 150) and a database-level account change from the database user account to a second database account). At step 504, account lineage tracking computing platform 110 may receive a first account-change message indicating the source-level account change instances. At step 505, account lineage tracking computing platform 110 may receive a second account-change message indicating the database-level account change instances.

At step 507, account lineage tracking computing platform 110 may generate a multi-level account lineage profile based on the first and second account-change messages. For example, the multi-level account lineage profile may include both the source-level account lineage profile illustrated in FIG. 3B (e.g., step 311) and the database-level account lineage profile illustrated in FIG. 4A (e.g., step 404). For instance, the multi-level account lineage profile may include information indicating the source-level portions 770 of the account lineage illustrated in FIG. 7D, the database-level portions 771 of the account lineage illustrated in FIG. 7A, and/or the database-level portions 772 of the account lineage illustrated in FIG. 7D. At step 508, administrator computing device 130 may receive the multi-level account lineage profile from account lineage tracking computing platform 110. Based on the multi-level account lineage profile, administrator computing device 130 may determine that the account-lineage chain is complete and the source user account of UCD2 150 is an originating account. At step 509, administrator computing device 130 may grant one or more rights for the accounts in the complete account lineage chain to allow and/or otherwise enable such accounts to access the target database based on determining that the account-lineage chain is complete.

Figure 6A:
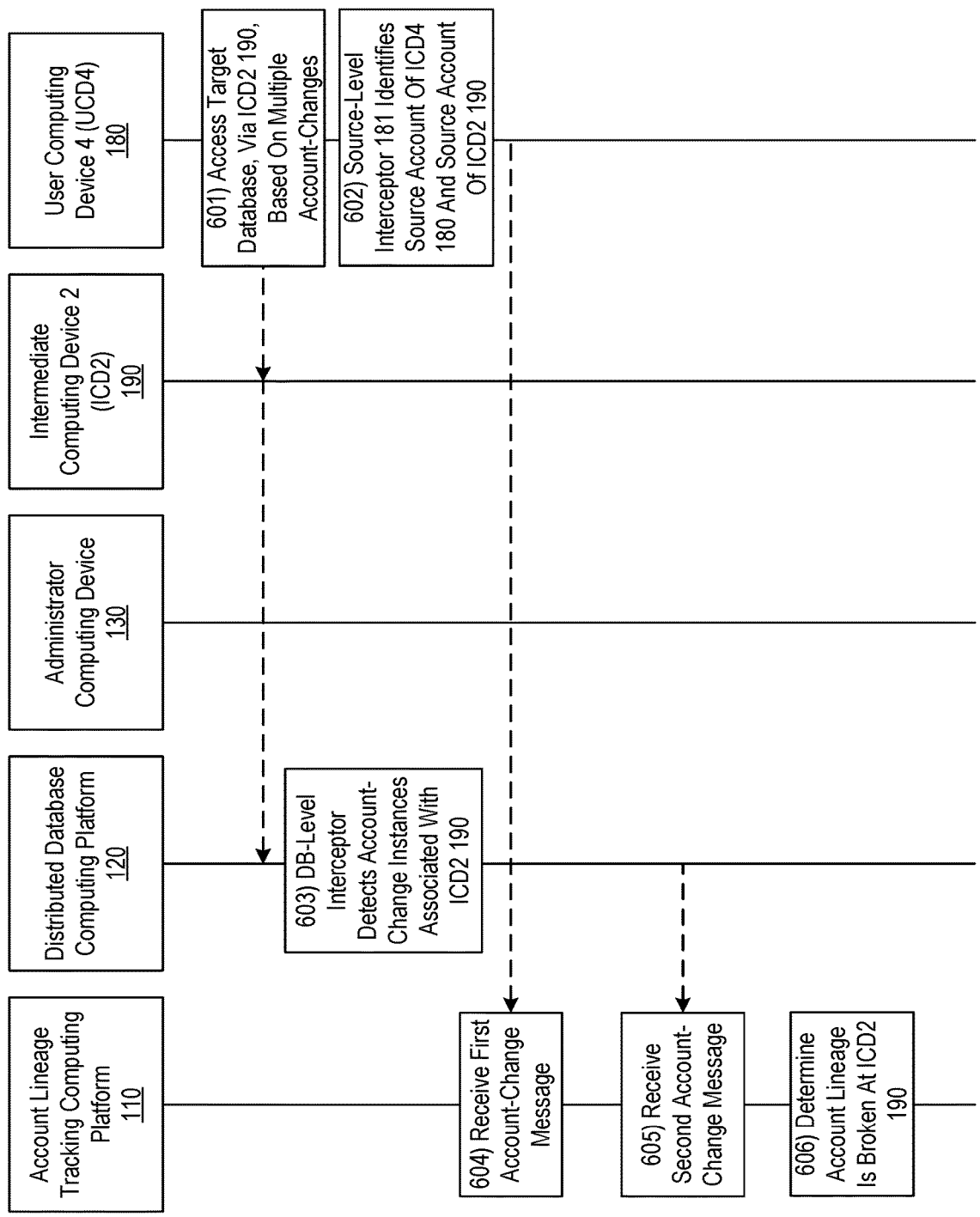
FIGS. 6A-6B depict another illustrative event sequence for controlling access to secure information resources using account lineage tracking and verification in accordance with one or more example embodiments.
Figure 6B:
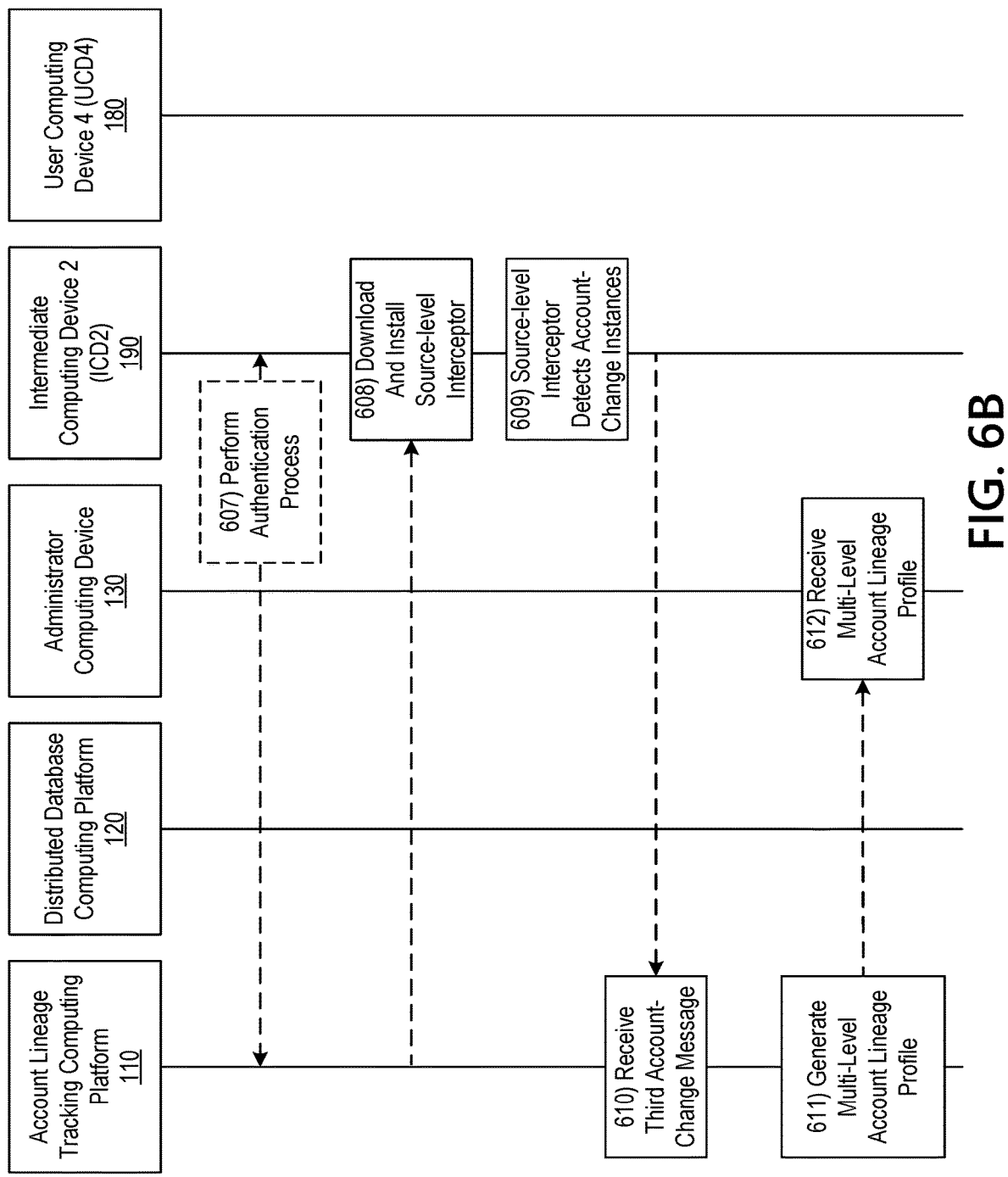

FIGS. 6A-6B depict another illustrative event sequence for controlling access to secure information resources using account lineage tracking and verification in accordance with one or more example embodiments. One or more processes illustrated in FIGS. 6A-6B may be performed, for example, if a user of a user computing device (e.g., UCD4 180) having a source-level interceptor installed thereon attempts to access distributed database computing platform 120 via one or more intermediate computing devices (e.g., ICD2 190) that do not have source-level interceptors. One or more processes illustrated in FIGS. 6A-6B may be similar to those discussed above. As seen in FIG. 1A, UCD4 180 may include a source-level interceptor but ICD2 190 might not include a source-level interceptor. Account lineage tracking computing platform 110 may receive a first account-change message from UCD4 180 and a second account-change message from distributed database computing platform 120. Based on the first account-change message and the second account-change message, account lineage tracking computing platform 110 may determine that UCD4 180 attempts to access distributed database computing platform 120 via an intermediate computing device (e.g., ICD2 190) that does not have a source-level interceptor. Account lineage tracking computing platform 110 may identify ICD2 190 and cause ICD2 190 to install a source-level interceptor. While FIGS. 3A-3B illustrate a backward tracking process to identify UCD3 160 and its originating account, FIGS. 6A-6B illustrate a forward tracking process to identify ICD2 190 and its source user accounts associated with an account lineage chain between UCD4 180 and distributed database computing platform 120.

In some embodiments, UCD4 180 may use a remote access application to access and control ICD2 190. For instance, UCD4 180 may access ICD2 190 with an access grant by ICD2 190. UCD4 180 may control one or more computing resources of ICD2 190 to access a target database of distributed database computing platform 120. ICD2 190 may be a user computing device having a remote access application, a virtualization server configured to be accessed by one or more user computing devices, a cloud computing server, etc.

Referring to FIG. 6A, at step 601, UCD4 180 may access a target database, via ICD2 190, based on multiple account changes. For example, UCD4 180 may access ICD2 190 using a first source user account of UCD4 180 and may perform a first account change from the first source user account of UCD4 180 to a second source user account of ICD2 190. UCD4 180 may control ICD2 190 to perform a second account change from the second source user account of ICD2 190 to a database user account configured to access a target database of distributed database computing platform 120.

At step 602, source-level interceptor 181 of UCD4 180 may detect one or more account change instances including information of the first source user account of UCD4 140 and the second source user account of ICD2 190. The second account change from the second source user account of ICD2 190 to the database user account occurring in ICD2 190 might not be detected.

At step 603, a database-level interceptor of the target database of distributed database computing platform 120 may detect one or more account change instances associated with ICD2 190 (e.g., the access to the target database using the database user account used via ICD2 190, an account change from the database user account to a second database account, etc.).

At step 604, account lineage tracking computing platform 110 may receive a first account-change message indicating the source-level account change instances in UCD4 180. At step 605, account lineage tracking computing platform 110 may receive a second account-change message indicating the database-level account change instances in the target database in distributed database computing platform 120. However, account lineage tracking computing platform 110 might not receive an account-change message from ICD2 190, which has not installed a source-level interceptor. At step 606, account lineage tracking computing platform 110 may determine that an account lineage chain is incomplete (e.g., account lineage chain is broken at ICD2 190), for example, because account lineage tracking computing platform 110 has not received an account-change message from ICD2 190.

A source-level interceptor may be installed on ICD2 190 to cure the incomplete account chain. Referring to FIG. 6B, at step 607, account lineage tracking computing platform 110 (or administrator computing device 130) may perform an authentication process with ICD2 190. For example, account lineage tracking computing platform 110 may perform the authentication process with ICD2 190, as discussed above. For instance, the authentication process may be based on one or more processes similar to those illustrated in FIGS. 2A and 2B (e.g., steps 201 and 251-255). At step 608, ICD2 190 may download and install a source-level interceptor. At step 609, ICD2 190 may detect one or more account-change instances in ICD2 190.

At step 610, the source-level interceptor installed on ICD2 190 may send a third account-change message. For example, the third account-change message may indicate the second account change from the second source user account of ICD2 190 to the database user account (and/or any other account change instances in ICD2 190 associated with the account chain).

At step 611, account lineage tracking computing platform 110 may generate a multi-level account lineage profile. For example, the multi-level account lineage profile may be generated based on the first account-change message, the second account-change message, and the third account change message. The multi-level account lineage profile may indicate that an account lineage chain updated based on the third account-change message is now complete. At step 612, administrator computing device 130 may receive the multi-level account lineage profile.

Figure 7B:
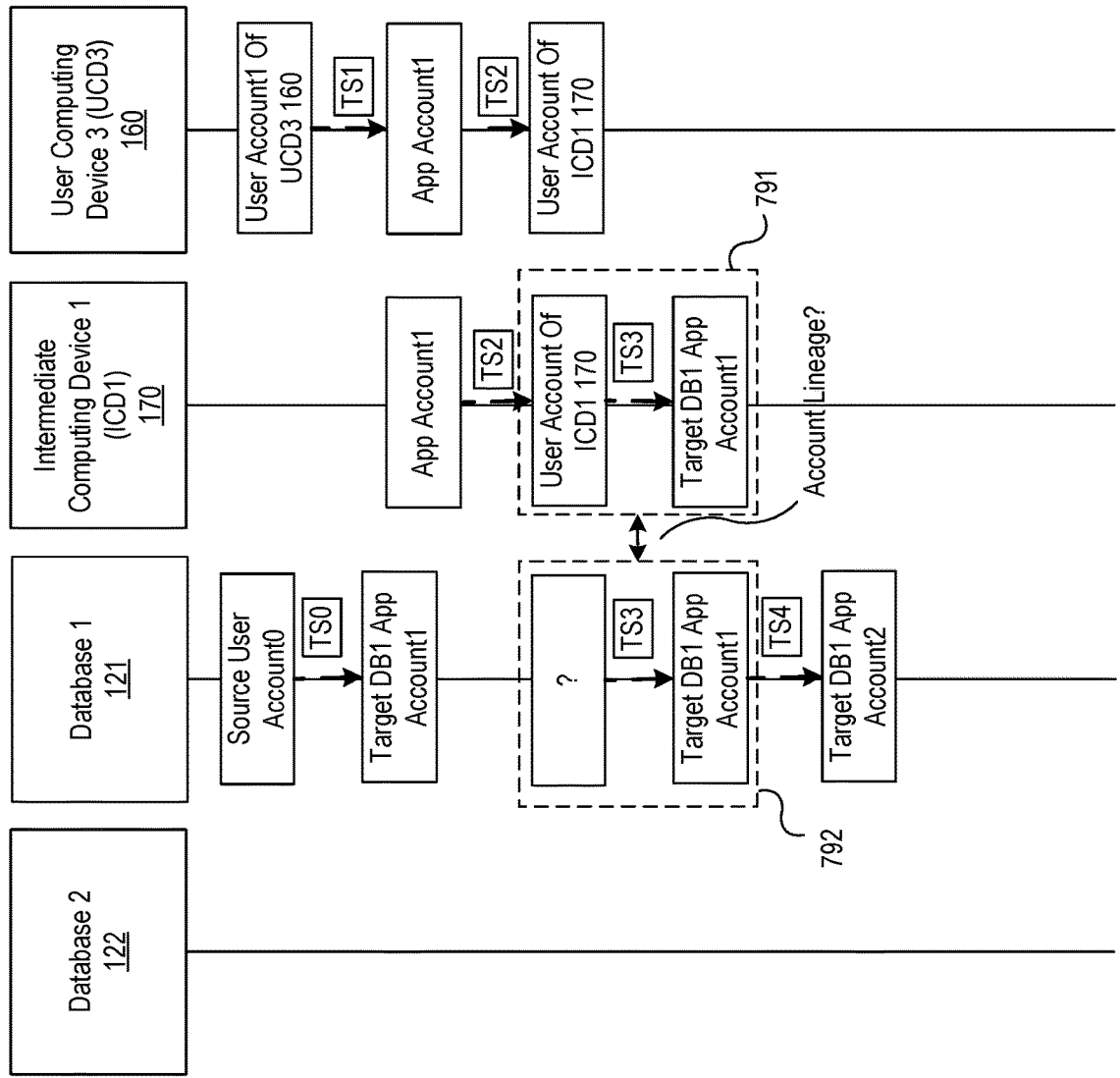

FIGS. 7A-7D depict an illustrative information flow associated with one or more account lineage profiles in accordance with one or more example embodiments. Referring to FIG. 7A, a first database-level account change instance from source user account0 to target DB1 app account1 may have occurred at a time corresponding to a timestamp TS0. A second database-level account change instance from an unknown source account to target DB1 app account1 may have occurred at a time corresponding to a timestamp TS3 (e.g., the unknown source account accesses database1 121 using target DB1 app account1 at the time corresponding to TS3). The unknown source account may be a source user account of ICD1 170 unknown to distributed database computing platform 120. A third database-level account change instance from target DB1 app account1 to target DB1 app account2 may have occurred at a time corresponding to a timestamp TS4.

The second database-level account change instance and the third database-level account change instance may be linked to each other based one or more timestamps (e.g., TS3 and TS4), session information (e.g., whether one or more sessions associated with an account is valid or expired). For example, a difference between TS3 and TS4 may be within a threshold time period (e.g., 30 minutes, one hour, three hours, one day, etc.) to link the second database-level account change instance and the third database-level account change to each other. To link the second database-level account change instance and the third database-level account change to each other, the database-level interceptor may determine target DB1 App account1 is still signed in and in an active session when target DB1 app account2 is accessed. Distributed database computing platform 120 may identify and provide one or more network identifiers of ICD1 170 and the timestamp TS3 to assist the determination whether to link the second database-level account change instance and the third database-level account change instance to each other.

A source-level interceptor of UCD3 160 may detect one or more source-level account-change instances in UCD3 160. For example, a first source-level account change instance from source user account1 of UCD3 160 to App account1 may have occurred at a time corresponding to a timestamp TS1. A second source-level account change instance from App account1 to a source user account of ICD1 170 may have occurred at a time corresponding to a timestamp TS2.

The first source-level account change instance and the second source-level account change instance may be linked to each other based one or more timestamps (e.g., TS1 and TS2), session information (e.g., whether one or more sessions associated with an account is valid or expired). For example, a difference between TS1 and TS2 may be within a threshold time period (e.g., one hour, three hours, one day, etc.) to link the first source-level account change instance and the second source-level account change to each other. To determine the linkage, the source-level interceptor of UCD3 160 may determine source user account1 is still signed in (and in active sessions) when app account1 is accessed.

A source-level interceptor of ICD1 170 may detect one or more source-level account-change instances in ICD1 170. For example, a third source-level account change instance from App account1 to the source user account of ICD1 170 may have occurred at a time corresponding to a timestamp TS2. A fourth source-level account change instance from the source user account of ICD1 170 to target DB1 app account1 may have occurred at a time corresponding to a timestamp TS3.

The third source-level account change instance and the fourth source-level account change instance may be linked to each other based one or more timestamps (e.g., TS2 and TS3), session information (e.g., whether one or more sessions associated with an account is valid or expired). For example, a difference between TS2 and TS3 may be within a threshold time period (e.g., one hour, three hours, one day, etc.) to link the third source-level account change instance and the fourth source-level account change to each other. To determine the linkage, the source-level interceptor of ICD1 170 may determine app account1 and/or source user account of ICD1 170 are still signed in (and in active sessions) when target DB1 app account1 is accessed.

The first database-level account change instance might not be linked to other account-change instances illustrated in FIG. 7A. For example, source user account0 is not associated with ICD1 170 or UCD3 160 and/or TS0 may be too remote (e.g., a difference between TS0 and another timestamp illustrated in FIG. 7A may be greater than the threshold time period). For instance, the session associated with source user account0 may be already expired.

Referring to FIG. 7B, account lineage tracking computing platform 110 may determine whether a first account lineage segment 791 is associated with a second account lineage segment 792. For example, the timestamps TS3 of the first account lineage segment 791 and the second account lineage segment 792 may be compared to each other to determine whether the first account lineage segment 791 and the second account lineage segment 792 need to be linked. One or more network identifiers of ICD1 170 associated with the first account lineage segment 791 and the second account lineage segment 792 may be compared to each other to determine whether the first account lineage segment 791 and the second account lineage segment 792 need to be linked. Although FIG. 7A illustrates that the timestamps TS3 of the first account lineage segment 791 and the second account lineage segment 792 are identical, the timestamp of the first account lineage segment 791 and the timestamp of the second account lineage segment 792 may be slightly different, for example, a difference between the two timestamps TS3 is within a threshold timing error difference (e.g., 0.1 ms, 1 ms, 1 sec, etc.).

Figure 7C:
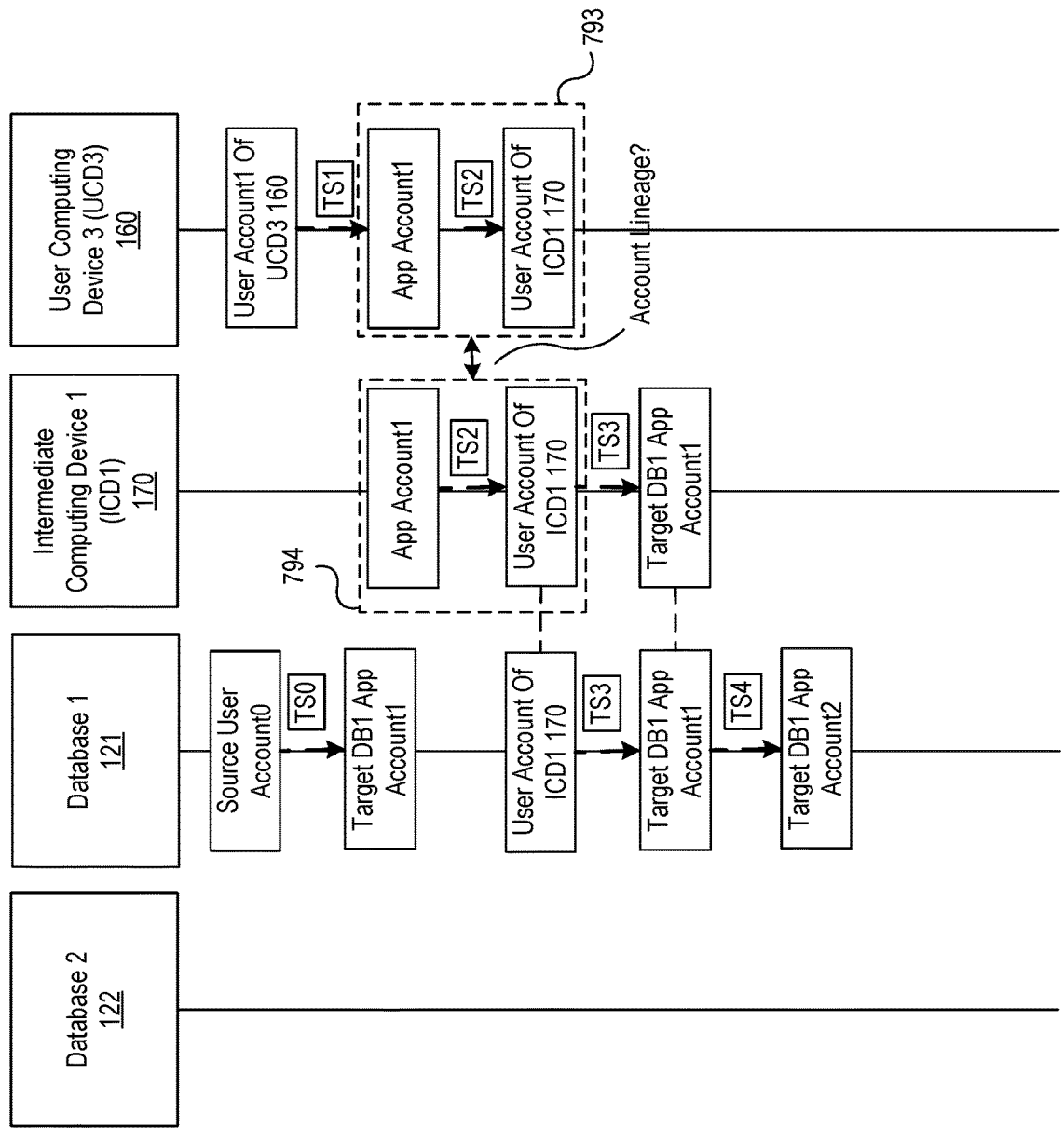

Account lineage tracking computing platform 110 may link the first account lineage segment 791 and the second account lineage segment 792 to each other as part of the same account lineage chain. As seen in FIGS. 7B-7C, the unknown source user account of ICD1 170 for the second account lineage segment 792 has been updated to source user account of ICD1 170 based on the first account lineage segment 791.

A third account lineage segment 793 and a fourth account lineage segment 794 may be linked to each other in a similar way. For example, account lineage tracking computing platform 110 may compare two timestamps TS2. Account lineage tracking computing platform 110 may also determine that each of the third account lineage segment 793 and the fourth account lineage segment 794 has app account1 as a source account and user account of ICD1 170 as a target account.

Figure 7D:
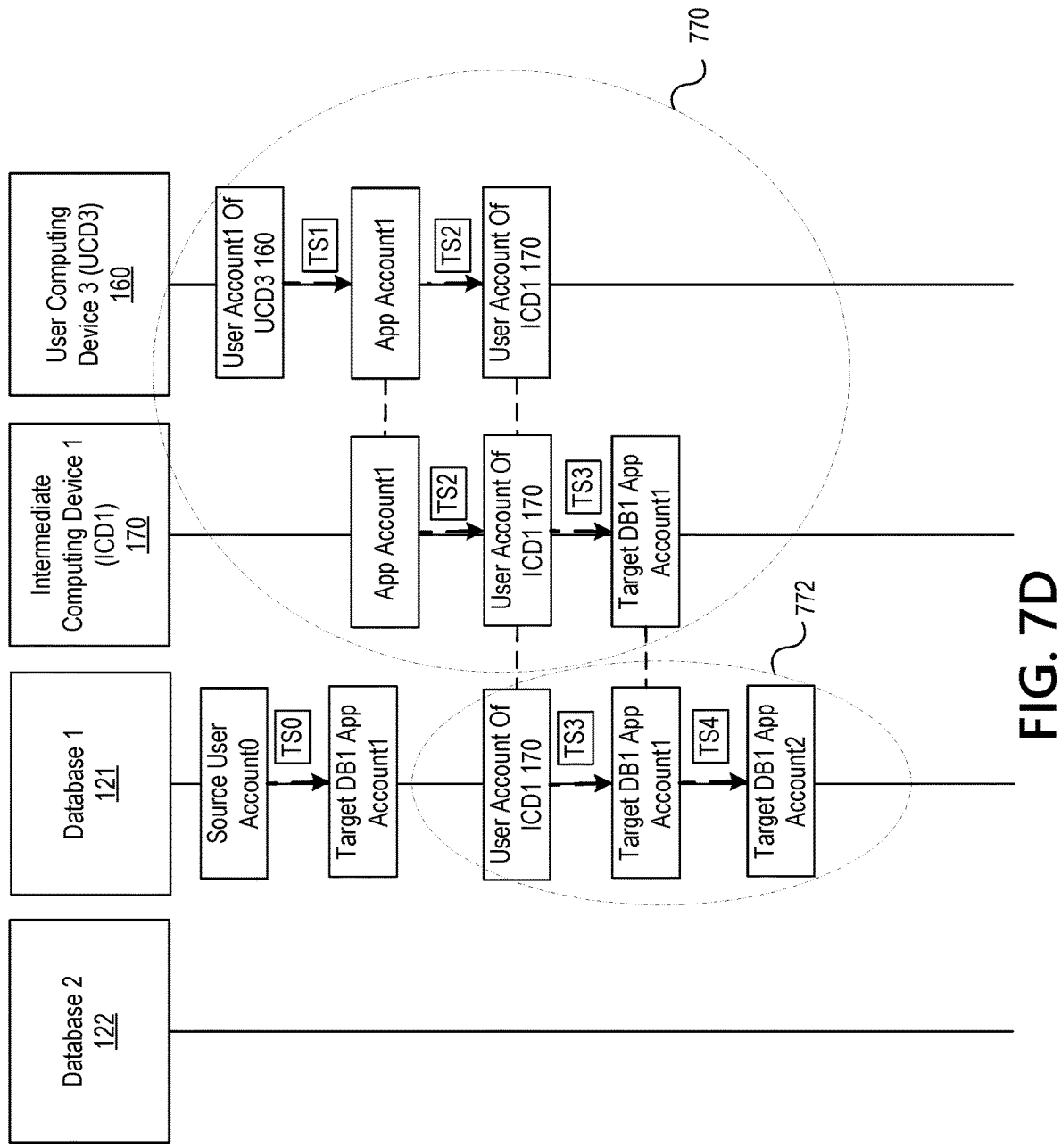

As seen in FIG. 7D, a complete multi-level account lineage chain including the source-level portions 770 and the database-level portions 772 may be generated by account lineage tracking computing platform 110. Account lineage tracking computing platform 110 may determine that an originating account in the complete multi-level account lineage chain is user account1 of UCD3 160 and the final target database account in the complete multi-level account lineage chain is target DB1 app account2.

Figure 8A:
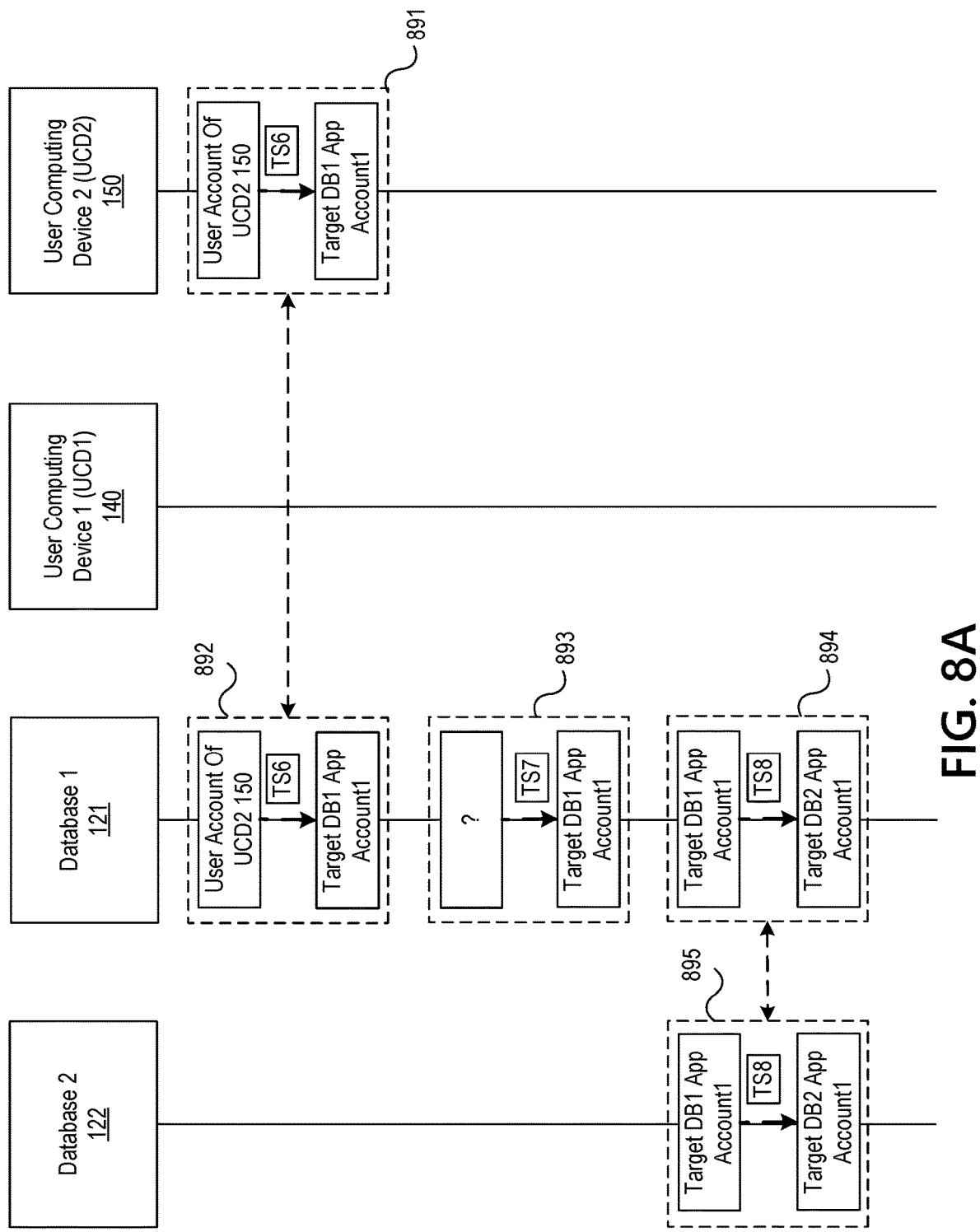
FIGS. 8A-8B depict another illustrative information flow associated with one or more account lineage profiles in accordance with one or more example embodiments.
Figure 8B:
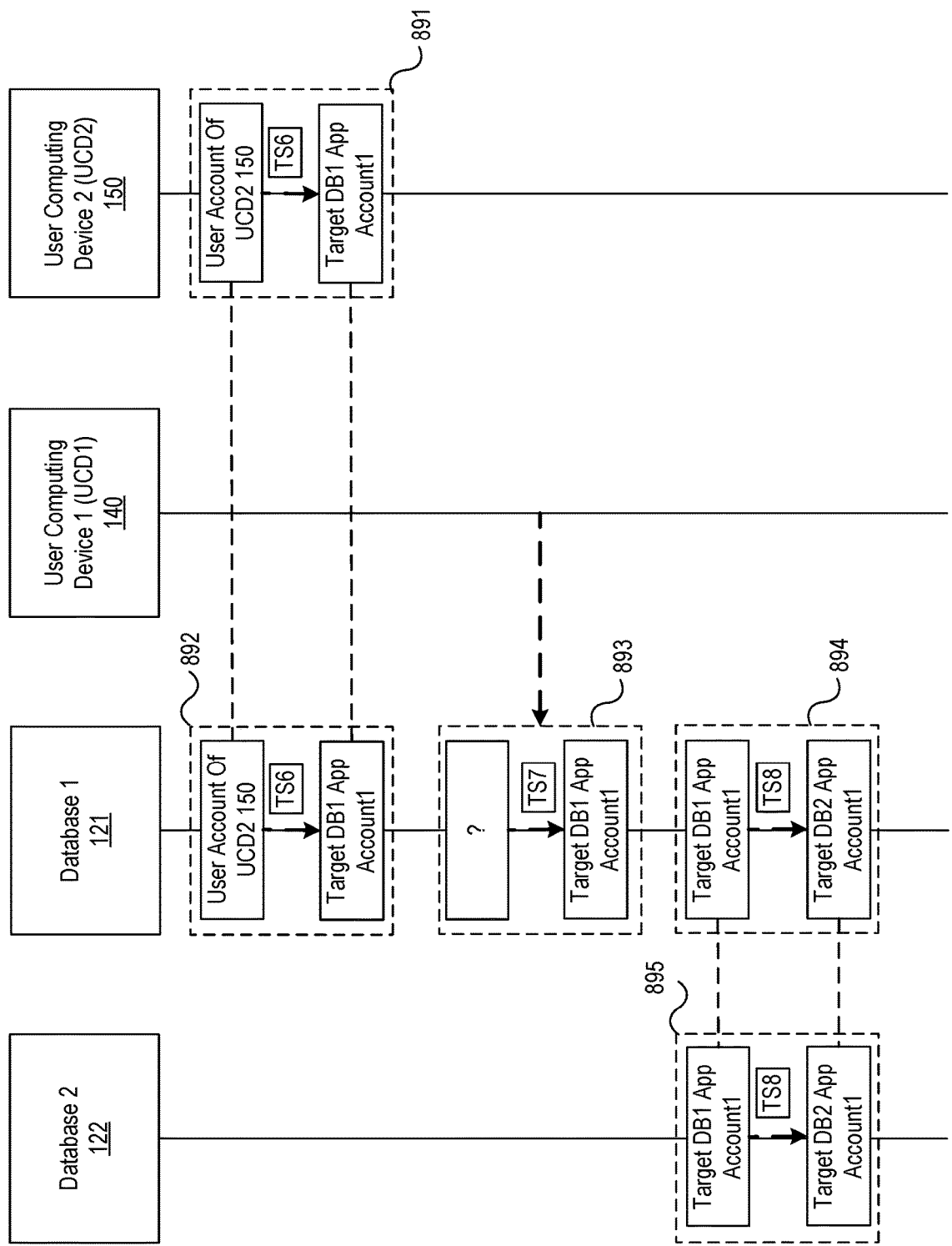

FIGS. 8A-8B depict another illustrative information flow associated with one or more account lineage profiles in accordance with one or more example embodiments. In FIGS. 8A-8B, a database-level interceptor of database1 121 of distributed database computing platform 120 may detect a plurality of account-change instances associated with target DB1 App account1. For example, target DB1 App account1 may be accessed by UCD1 140 (not having a source-level interceptor) and UCD2 150 (having source-level interceptor 151). Account lineage tracking platform 110 may determine whether a database-level account lineage segment 894 is associated with a database-level account lineage segment 892 and a database-level account lineage segment 893.

Referring to FIG. 8A, account lineage tracking computing platform 110 may identify a source-level account lineage segment 891 and database-level account lineage segment 892, for example, after receiving one or more account-change messages, as discussed above. For example, a user of UCD2 150 may use a source user account of UCD2 150 and launch a database access application. The user of UCD2 150 may use target DB1 app account1 to access database1 121 at a time corresponding to a timestamp TS6. While the user of UCD2 150 is accessing database1 121, the database-level interceptor of database1 121 may detect another database-level account-change instance at a time corresponding to a timestamp TS7, which has an incomplete account lineage chain to an unknown source user account (e.g., a difference between TS6 and TS7 may be less than a threshold time period). Account lineage tracking computing platform 110 may determine database-level account lineage segment 893 based on the database-level account-change instance at a time corresponding to a timestamp TS7.

Account lineage tracking computing platform 110 may identify database-level account lineage segment 894 and a database-level account lineage segment 895, for example, after receiving one or more account-change messages, as discussed above. For example, the database-level interceptor of database1 121 may detect an account-change instance from target DB1 app account1 to target DB2 app account1 at a time corresponding to TS8. Also, a database-level interceptor of database2 122 may detect an account-change instance from target DB1 app account1 to target DB2 app account1 at a time corresponding to TS8.

Referring to FIG. 8B, account lineage tracking computing platform 110 may link the database-level account lineage segment 894 and the database-level account lineage segment 895 as part of a same account lineage chain. Also, account lineage tracking computing platform 110 may link the database-level account lineage segment 891 and the database-level account lineage segment 892 as part of a same account lineage chain.

Account lineage tracking computing platform 110 may determine the database-level account lineage segment 894 may be associated with one or more of the database-level account lineage segment 892 and/or the database-level account lineage segment 893. Account lineage tracking computing platform 110 may determine that the database-level account lineage segment 893 may be a suspicious candidate associated with the account lineage segments 891, 892, 894, and 895.

Account lineage tracking computing platform 110 may perform one or more processes based on identifying a suspicious candidate (e.g., the database-level account lineage segment 893). For example, account lineage tracking computing platform 110 may send an alert to administrator computing device 130 notifying a user of administrator computing device 130 of the suspicious candidate and its relationship with the account lineage segments 891, 892, 894, and 895. The alert may include one or more account lineage profiles so that administrator computing device 130 can reconstruct one or more account lineage chains and account lineage profiles (e.g., as illustrated in FIGS. 8A-8B).

Account lineage tracking computing platform 110 and/or administrator computing device 130 may verify whether the database-level account lineage segment 893 is authorized. For example, account lineage tracking computing platform 110 may cause UCD1 140 to install a source-level interceptor to identify the unknown source account of the database-level account lineage segment 893. If both the database-level account lineage segment 893 and the database-level account lineage segment 894 are authenticated, both the database-level account lineage segment 893 and the database-level account lineage segment 894 may be linked to the database-level account lineage segment 894. A source-level interceptor may be installed on UCD1 140 to identify one or more source account-change instances in UCD1 140 (and additional computing devices associated with UCD1 140), and a complete account lineage chain may be generated including one or more source-level account-change instances in UCD1 140.

If the database-level account lineage segment 894 is not authenticated, account lineage tracking computing platform 110 may cause database1 121 to terminate a session associated with the database-level account lineage segment 893. Account lineage tracking computing platform 110 may alert such suspicious events to administrator computing device 130 so that suspicious account-change instances can be updated in the account lineage profile database.

Figure 9:
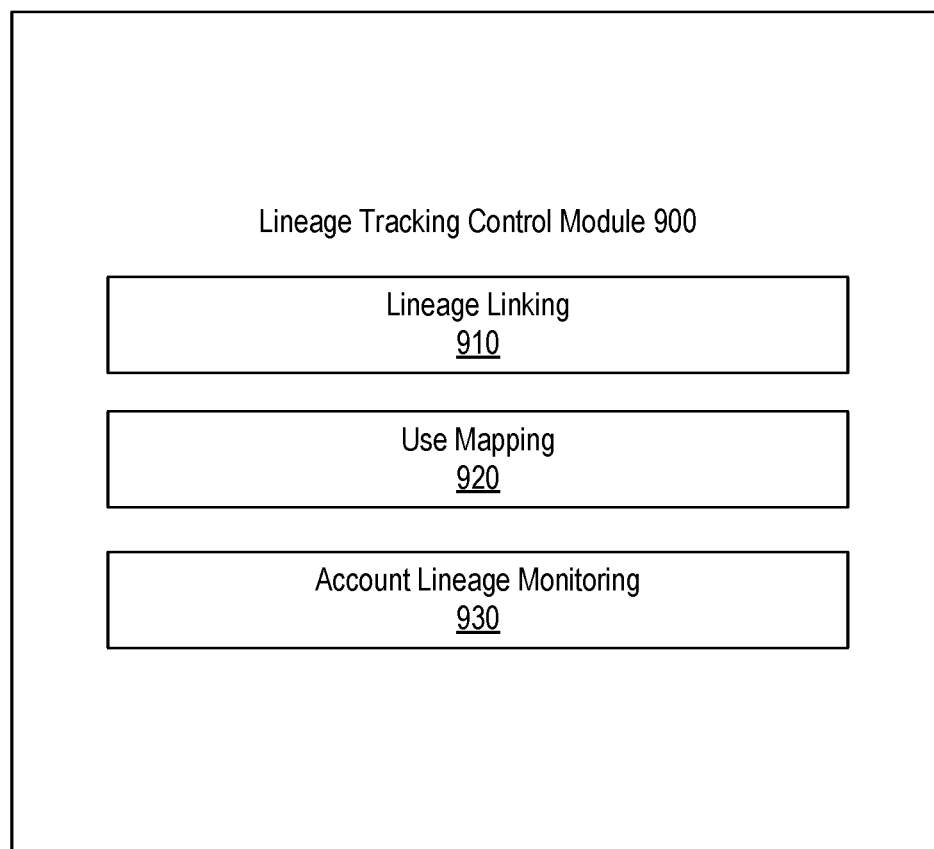
FIG. 9 depicts one or more illustrative example modules for controlling access to secure information resources using an account lineage tracking system in accordance with one or more example embodiments.

FIG. 9 depicts one or more illustrative modules for controlling access to secure information resources using an account lineage tracking system in accordance with one or more example embodiments. One or more modules (or sub-modules, functions, and/or processes) illustrated in FIG. 9 may be implemented by administrator computing device 130 and/or account lineage tracking computing platform 110. Referring to FIG. 9, a lineage tracking control module 900 may include one or more of: a lineage linking 910, a use mapping 920, and/or an account lineage monitoring 930. Lineage linking 910 may include identifying information included in database-level account-change message and source-level account-change message, identifying and linking account-change instances and/or account lineage segments, and generating one or more account lineage profiles, as discussed above. Use mapping 920 may include maintaining an entitlement catalog and mapping, based on the entitlement catalog, one or more entitlements for each account in an account lineage chain. Use mapping 920 may also include identifying one or more accounts in an account lineage chain that are not granted to have one or more rights in distributed database computing platform 120. An account lineage monitoring 930 may include monitoring and analyzing account lineage data (e.g., generating and sending notifications to an access review tool for reviewing account access histories associated with various different account lineage chains, generating and sending notifications to a monitoring tool for monitoring account use histories and/or for a trend analysis). Account lineage monitoring 930 may also include determining whether account-change instances are usual or unusual in view of historical account-lineage chains and account lineage profiles.

For account lineage monitoring 930, a machine learning-based classification model may be implemented. The account lineage profile database may accumulate account lineage profile data and build a baseline data set for machine learning-based training. The machine learning-based classification model may be generated and use the baseline data set. One or more unusual account use patterns and account lineage profiles may be identified and notified to one or more monitoring tools.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
    at least one processor;
    a communication interface communicatively coupled to the at least one processor; and
    memory storing computer-readable instructions that, when executed by the at least one processor, cause the computing platform to:
        receive, via the communication interface, from a source-level interceptor of a first computing device, a first account-change message, wherein the first account-change message comprises information identifying a source account associated with the first computing device and identifying a first target account associated with a target application configured to access a target database;
        receive, via the communication interface, from a database-level interceptor associated with the target database, a second account-change message, wherein the second account-change message comprises information identifying the first target account as a database-level source account and identifying a second target account associated with one or more target databases;
        generate, based on the first account-change message and the second account-change message, a notification comprising information associated with an account lineage between the source account and the second target account; and
        send, via the communication interface, to an administrator user computing device associated with the target database, the notification comprising the information associated with the account lineage between the source account and the second target account.

2. The computing platform of claim 1, wherein the memory stores additional computer-readable instructions that, when executed by the at least one processor, cause the computing platform to:
    determine a first timestamp comprised in the first account-change message and a second timestamp comprised in the second account-change message, wherein the first timestamp indicates a time of accessing the first target account by the source account, and wherein the second timestamp indicates a time of accessing the target database by the first target account; and determine, based on a comparison of the first timestamp and the second timestamp, a first account lineage segment between the source account and the first target account.

3. The computing platform of claim 2, wherein the memory stores additional computer-readable instructions that, when executed by the at least one processor, cause the computing platform to:
determine a third timestamp comprised in the second account-change message, wherein the third timestamp indicates a time of requesting an account change from the first target account to the second target account; and
determine, based on a comparison of the second timestamp and the third timestamp, a second account lineage segment between the first target account and the second target account,
wherein the information associated with the account lineage between the source account and the second target account comprises information of the first account lineage segment and information of the second account lineage segment.

4. The computing platform of claim 1,
wherein the first account-change message further comprises device information of the first computing device, one or more commands associated with the source account, and one or more timestamps; and
wherein the second account-change message further comprises database information of the target database, one or more commands associated with the target database, and one or more timestamps.

5. The computing platform of claim 1, wherein the memory stores additional computer-readable instructions that, when executed by the at least one processor, cause the computing platform to determine, based on the first account-change message, that the source account is an originating account, and
wherein the notification further comprises information indicating that the source account is an originating account.

6. The computing platform of claim 5, wherein the memory stores additional computer-readable instructions that, when executed by the at least one processor, cause the computing platform to:
based on determining that the source account is an originating account, cause a grant of an account-change from the first target account to the second target account.

7. The computing platform of claim 1, wherein the memory stores additional computer-readable instructions that, when executed by the at least one processor, cause the computing platform to:
determine, based on the first account-change message, that the source account is associated with a second source account, wherein the second source account is associated with a second computing device;
receive, via the communication interface, from a second source-level interceptor of the second computing device, a third account-change message comprising information identifying the second source account and identifying the source account associated with the first computing device; and
generate, based on the first account-change message, the second account-change message, and the third account-change message, information associated with an account lineage between the second source account and the second target account,
wherein the notification comprises the information associated with the account lineage between the second source account and the second target account.

8. The computing platform of claim 7, wherein the memory stores additional computer-readable instructions that, when executed by the at least one processor, cause the computing platform to determine, based on the third account-change message, that the second source account is an originating account.

9. The computing platform of claim 7, wherein the memory stores additional computer-readable instructions that, when executed by the at least one processor, cause the computing platform to:
based on determining that the source account is not an originating account, cause a denial of an account-change from the first target account to the second target account.

10. The computing platform of claim 1, wherein the second target account has one or more rights associated with the target database that are unavailable to the first target account.

11. The computing platform of claim 1, wherein the memory stores additional computer-readable instructions that, when executed by the at least one processor, cause the computing platform to:
receive, via the communication interface, from the database-level interceptor, a third account-change message comprising information identifying the first target account as a database-level source account and a third target account associated with a second target database; and
generate, based on the first account-change message and the third account-change message, a notification comprising information associated with an account lineage between the source account and the third target account.

12. The computing platform of claim 1, wherein the memory stores additional computer-readable instructions that, when executed by the at least one processor, cause the computing platform to:
receive, via the communication interface, from a second source-level interceptor of a second computing device, a third account-change message comprising information identifying a second source account associated with the second computing device and identifying the first target account; and
determine, based on the first account-change message, a first account lineage segment between the source account and the first target account;
determine, based on the second account-change message, a second account lineage segment between the first target account and the second target account;
determine, based on the third account-change message, a third account lineage segment between the second source account and the first target account; and
generate an account lineage profile by linking the second account lineage segment to one or more of:
the first account lineage segment; or
the third account lineage segment.

13. The computing platform of claim 1, wherein the memory stores additional computer-readable instructions that, when executed by the at least one processor, cause the computing platform to:
receive, via the communication interface, from a second source-level interceptor of a second computing device, a third account-change message comprising information identifying a second source account associated with the second computing device and identifying the first target account; and based on the first account-change message, the second account-change message, and the third account-change message, generate a notification indicating a suspicious account-lineage chain among the first target account, the source account, and the second source account.

14. The computing platform of claim 1, wherein the memory stores additional computer-readable instructions that, when executed by the at least one processor, cause the computing platform to:

determine, based on the first account-change message, device information of the first computing device, wherein the device information of the first computing device indicates a network identifier associated with the first computing device;

determine, based on the second account-change message, the network identifier associated with the first computing device; and verify, based on the device information and the network identifier, that the second account-change message is associated with the first account-change message.

15. The computing platform of claim 1, wherein the memory stores additional computer-readable instructions that, when executed by the at least one processor, cause the computing platform to:

receive, via the communication interface, from a second source-level interceptor of a second computing device, a third account-change message comprising information identifying a second source account associated with the second computing device and identifying the source account associated with the first computing device; and based on the second account-change message and the third account-change message, cause the first computing device to install the source-level interceptor of the first computing device, wherein the first account-change message is received after installing the source-level interceptor of the first computing device.

16. The computing platform of claim 1, wherein the one or more target databases comprise one or more of:

the target database; or a second target database.

17. A method, comprising:

at a computing platform comprising at least one processor, a communication interface, and memory:

receiving, via the communication interface, from a source-level interceptor of a first computing device, a first account-change message, wherein the first account-change message comprises information identifying a source account associated with the first computing device and identifying a first target account associated with a target application configured to access a target database;

receiving, via the communication interface, from a database-level interceptor associated with the target database, a second account-change message, wherein the second account-change message comprises information identifying the first target account as a database-level source account and identifying a second target account associated with one or more target databases;

generating, based on the first account-change message and the second account-change message, a notification comprising information associated with an account lineage between the source account and the second target account; and sending, via the communication interface, to an administrator user computing device associated with the target database, the notification comprising the information associated with the account lineage between the source account and the second target account.

18. The method of claim 17, wherein generating, based on the first account-change message and the second account-change message, the notification comprises:

determining a first timestamp comprised in the first account-change message and a second timestamp comprised in the second account-change message, wherein the first timestamp indicates a time of accessing the first target account by the source account, and wherein the second timestamp indicates a time of accessing the target database by the first target account; and determining, based on a comparison of the first timestamp and the second timestamp, a first account lineage segment between the source account and the first target account.

19. The method of claim 18, wherein generating, based on the first account-change message and the second account-change message, the notification comprises:

determining a third timestamp comprised in the second account-change message, wherein the third timestamp indicates a time of requesting an account change from the first target account to the second target account; and determining, based on a comparison of the second timestamp and the third timestamp, a second account lineage segment between the first target account and the second target account, wherein the information associated with the account lineage between the source account and the second target account comprises information of the first account lineage segment and information of the second account lineage segment.

20. One or more non-transitory computer-readable media storing instructions that, when executed by a computing platform comprising at least one processor, a communication interface, and memory, cause the computing platform to:

receive, via the communication interface, from a source-level interceptor of a first computing device, a first account-change message, wherein the first account-change message comprises information identifying a source account associated with the first computing device and identifying a first target account associated with a target application configured to access a target database;

receive, via the communication interface, from a database-level interceptor associated with the target database, a second account-change message, wherein the second account-change message comprises information identifying the first target account as a database-level source account and identifying a second target account associated with one or more target databases;

generate, based on the first account-change message and the second account-change message, a notification comprising information associated with an account lineage between the source account and the second target account; and send, via the communication interface, to an administrator user computing device associated with the target database, the notification comprising the information associated with the account lineage between the source account and the second target account.

* * * * *